US010310365B2

(12) United States Patent
Kaneda

(10) Patent No.: US 10,310,365 B2
(45) Date of Patent: Jun. 4, 2019

(54) ILLUMINATION UNIT AND DISPLAY

(71) Applicant: SONY CORPORATION, Tokyo (JP)

(72) Inventor: Kazumasa Kaneda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 15/856,897

(22) Filed: Dec. 28, 2017

(65) Prior Publication Data

US 2018/0120685 A1 May 3, 2018

Related U.S. Application Data

(63) Continuation of application No. 15/407,853, filed on Jan. 17, 2017, now Pat. No. 9,891,513, which is a (Continued)

(30) Foreign Application Priority Data

Jul. 12, 2011 (JP) ................................ 2011-153485

(51) Int. Cl.
*G03B 21/20* (2006.01)
*H04N 9/31* (2006.01)
(Continued)

(52) U.S. Cl.
CPC ............ *G03B 21/2053* (2013.01); *F21V 9/14* (2013.01); *F21V 13/00* (2013.01); (Continued)

(58) Field of Classification Search
CPC combination set(s) only.
See application file for complete search history.

(56) References Cited

U.S. PATENT DOCUMENTS 5,363,117 A 11/1994 Matsuura et al.
2007/0252918 A1 11/2007 Furuya et al.
(Continued)

FOREIGN PATENT DOCUMENTS

CN 102112917 A 6/2011
DE 10258990 A1 7/2004
(Continued)

OTHER PUBLICATIONS

Notice of Allowance for U.S. Appl. No. 15/407,853, dated Oct. 6, 2017, 10 pages.

(Continued)

*Primary Examiner* — Thanh Nhan P Nguyen
(74) *Attorney, Agent, or Firm* — CHIP LAW GROUP

(57) ABSTRACT

An illumination unit includes: a light source section including a laser light source; an optical-path branching device outputting light incident from the light source section, by branching the light into an outgoing optical path of illumination light and other optical path; a photodetector receiving a light flux that travels on the other optical path; a control section controlling an emitted light quantity in the laser light source, based on a quantity of the light flux received by the photodetector; and a light-quantity-distribution control device disposed between the optical-path branching device and the photodetector on the other optical path, the light-quantity-distribution control device controlling a light quantity distribution in the light flux to be incident upon the photodetector.

18 Claims, 23 Drawing Sheets

Related U.S. Application Data continuation of application No. 15/050,322, filed on Feb. 22, 2016, now Pat. No. 9,584,779, which is a continuation of application No. 13/540,740, filed on Jul. 3, 2012, now Pat. No. 9,285,101.

(51) Int. Cl.

| | |
|---|---|
| ***F21V 13/00*** | (2006.01) |
| ***G02B 27/10*** | (2006.01) |
| ***G03B 33/12*** | (2006.01) |
| ***F21V 9/14*** | (2006.01) |
| ***F21V 23/04*** | (2006.01) |
| ***G02B 27/12*** | (2006.01) |
| ***G02B 27/48*** | (2006.01) |
| ***G03B 21/00*** | (2006.01) |
| *G02F 1/1335* | (2006.01) |
| *G02F 1/13357* | (2006.01) |
| *G02F 1/135* | (2006.01) |

(52) U.S. Cl.

CPC .......... *F21V 23/0457* (2013.01); *G02B 27/10* (2013.01); *G02B 27/126* (2013.01); *G02B 27/48* (2013.01); *G03B 21/006* (2013.01); *G03B 21/2033* (2013.01); *G03B 21/2073* (2013.01); *G03B 33/12* (2013.01); *H04N 9/3155* (2013.01); *H04N 9/3161* (2013.01); *H04N 9/3164* (2013.01); *H04N 9/3167* (2013.01); *H04N 9/3194* (2013.01); *G02F 1/135* (2013.01); *G02F 1/1336* (2013.01); *G02F 1/133526* (2013.01); *G02F 2001/13355* (2013.01)

(56) References Cited

U.S. PATENT DOCUMENTS

| | | | | |
|---|---|---|---|---|
| 2011/0058109 | A1 | 3/2011 | Nishigaki et al. | |
| 2012/0038892 | A1* | 2/2012 | Kurtz .................. | H04N 9/3105 353/31 |

FOREIGN PATENT DOCUMENTS

| | | | |
|---|---|---|---|
| JP | 07-159748 | A | 6/1995 |
| JP | 2001-343703 | A | 12/2001 |
| JP | 2006-134534 | A | 5/2006 |
| JP | 2006-309850 | A | 11/2006 |
| JP | 2006-317681 | A | 11/2006 |
| JP | 2009-122366 | A | 6/2009 |
| JP | 2009-229558 | A | 10/2009 |
| JP | 2009-238568 | A | 10/2009 |
| JP | 2009-267214 | A | 11/2009 |
| JP | 2010-243808 | A | 10/2010 |
| JP | 2010-249980 | A | 11/2010 |
| JP | 4669879 | B2 | 4/2011 |
| WO | 2010/004749 | A1 | 1/2010 |
| WO | 2011/037014 | A1 | 3/2011 |

OTHER PUBLICATIONS

Non-Final Office Action for U.S. Appl. No. 15/407,853, dated Jun. 16, 2017, 08 pages.

Office Action for JP Patent Application No. 2011-153485, dated Apr. 21, 2015, 13 pages of Office Action and 06 pages of English Translation.

Office Action for CN Patent Application No. 201210232335.7, dated Apr. 3, 2015, 13 pages of Office Action and 07 pages of English Translation.

Office Action for U.S. Appl. No. 13/540,740, dated Nov. 2, 2015, 10 pages.

Office Action for CN Patent Application No. 201210232335.7, dated Nov. 6, 2015, 14 pages of Office Action and 08 pages of English Translation.

Notice of Allowance for U.S. Appl. No. 15/050,322, dated Oct. 13, 2016, 08 pages.

Non-Final Office Action for U.S. Appl. No. 15/050,322, dated Jun. 3, 2016, 12 pages.

Non-Final Office Action for U.S. Appl. No. 13/540,740, dated Apr. 8, 2015, 10 pages.

Notice of Allowance for U.S. Appl. No. 13/540,740, dated Nov. 2, 2015.

* cited by examiner

FIG. 7A 32°C
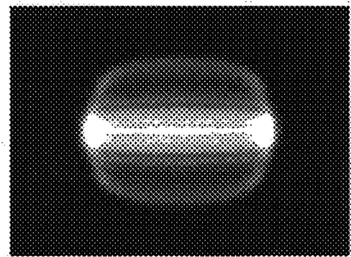
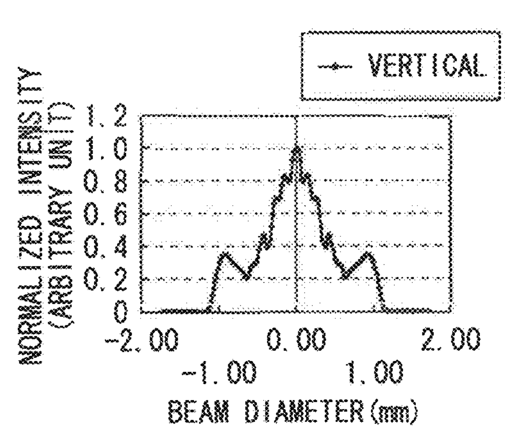
FIG. 7B 37°C
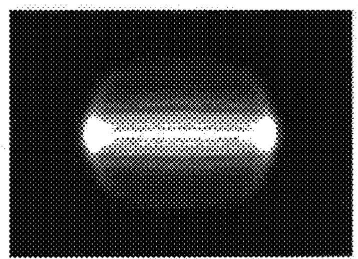
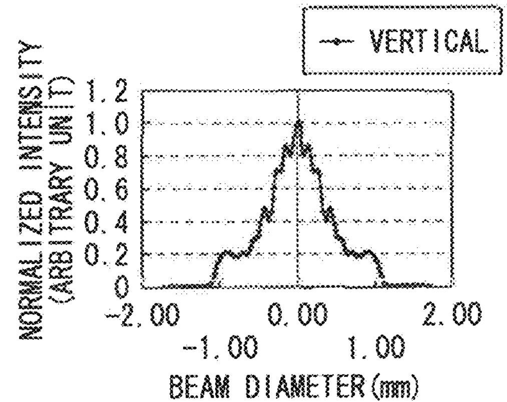
FIG. 7C 43°C
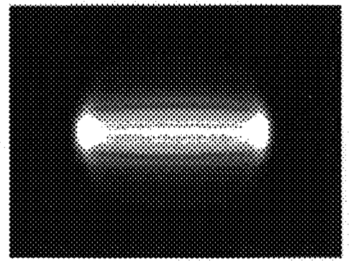
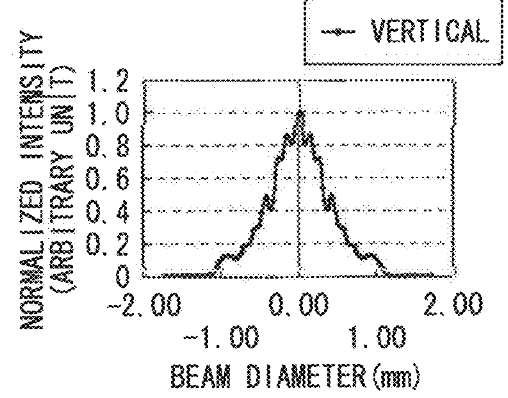

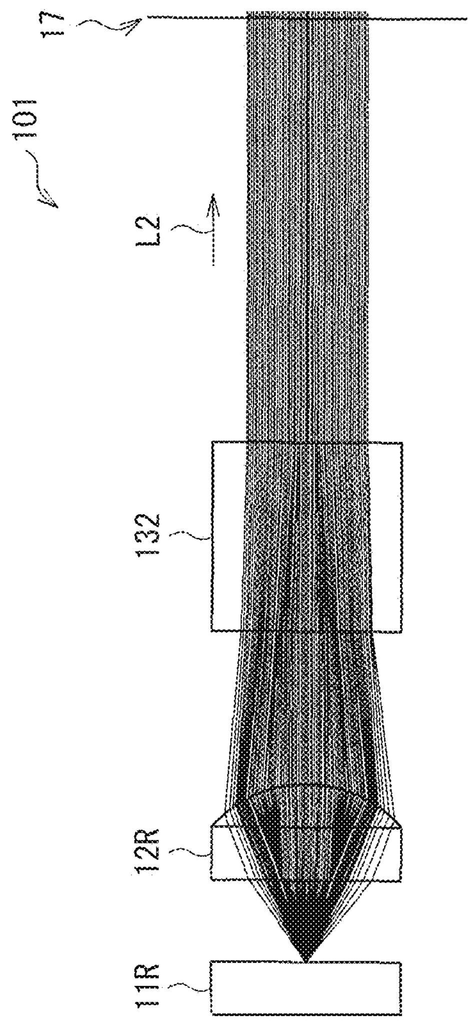
FIG. 8A COMPARATIVE EXAMPLE
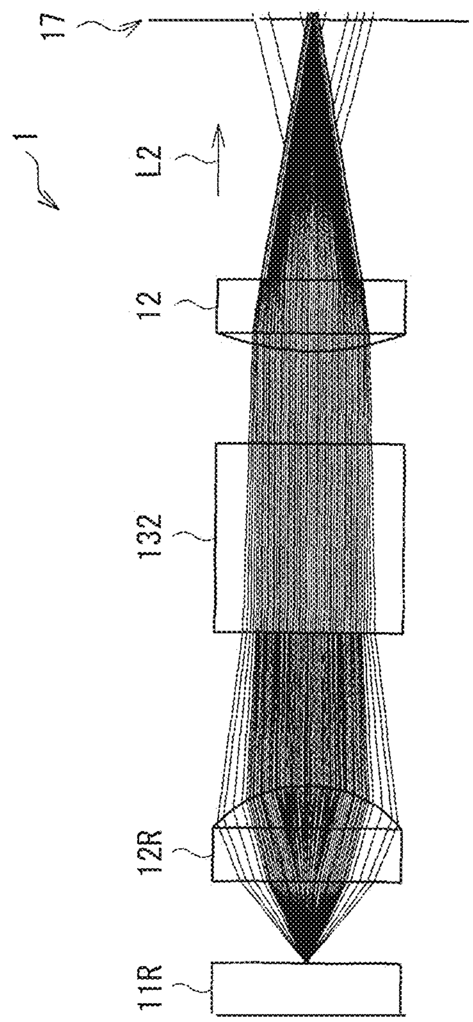
FIG. 8B EXAMPLE 1

FIG. 9A COMPARATIVE EXAMPLE
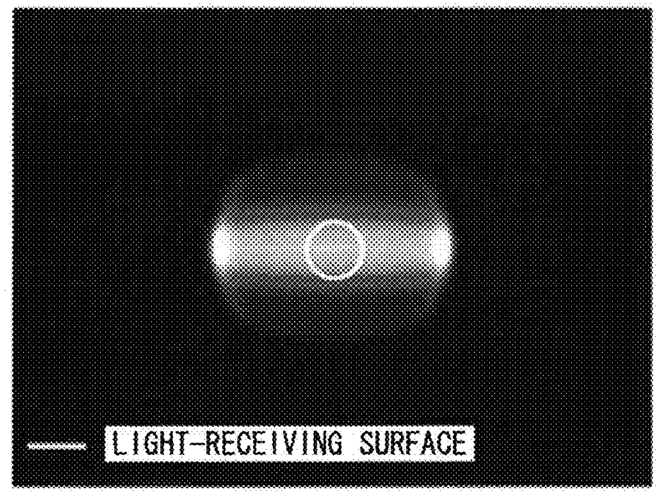
FIG. 9B EXAMPLE 1
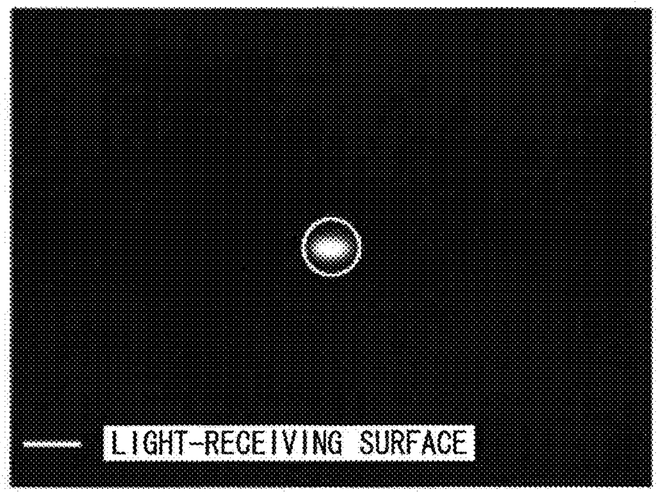

EXAMPLE 2

COMPARATIVE EXAMPLE

EXAMPLE 2

FIG. 13A COMPARATIVE EXAMPLE
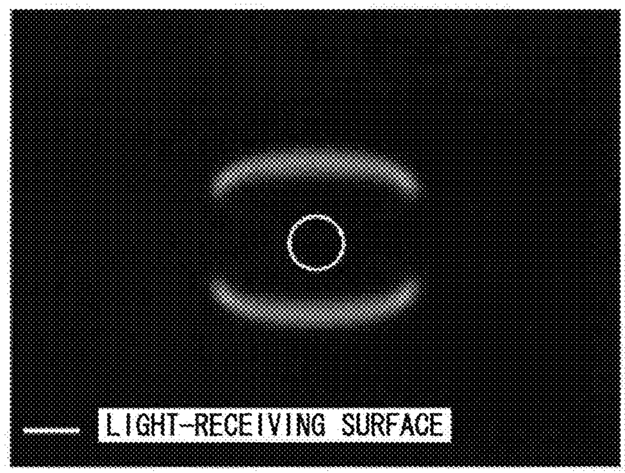
FIG. 13B EXAMPLE 2
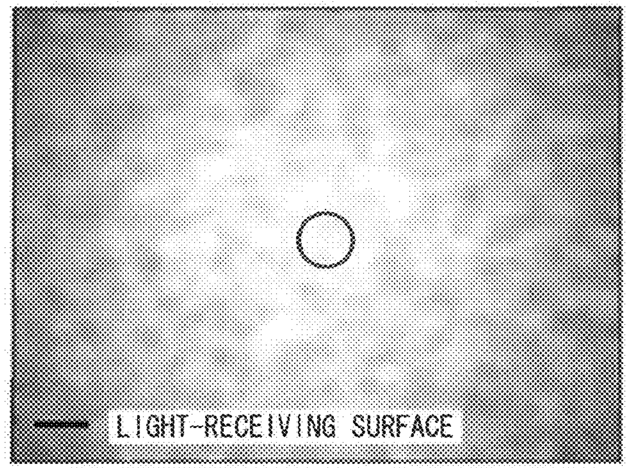

P-POLARIZED LIGHT COMPONENT

S-POLARIZED LIGHT COMPONENT

◇QUANTITY OF ILLUMINATION LIGHT

| | S-POLARIZED LIGHT | P-POLARIZED LIGHT | |
|---|---|---|---|
| QUANTITY OF LIGHT EMITTED FROM LIGHT SOURCE | 95% | 5% | |
| PRISM REFLECTANCE | 95% | 25% | |
| TOTAL | 90.25% | 1.25% | → 72.2 : 1 |

◇QUANTITY OF LIGHT FLUX TRAVELING TO PHOTODETECTOR

| | S-POLARIZED LIGHT | P-POLARIZED LIGHT | |
|---|---|---|---|
| QUANTITY OF LIGHT EMITTED FROM LIGHT SOURCE | 95% | 5% | |
| PRISM REFLECTANCE | 5% | 75% | |
| TOTAL | 4.75% | 3.75% | → 1.27 : 1 |

FIG. 16

| | S-POLARIZED LIGHT | P-POLARIZED LIGHT |
|---|---|---|
| 28°C | 482.8mW | 24.9mW |
| 38°C | 440.6mW | 20.1mW |
| CHANGE RATE | 0.91 | 0.81 |

$(\Delta Is/\Delta T)=(0.91/10)=0.091$ $(\Delta Ip/\Delta T)=(0.81/10)=0.081$

FIG. 17

◇QUANTITY OF ILLUMINATION LIGHT

| | S-POLARIZED LIGHT | P-POLARIZED LIGHT | |
|---|---|---|---|
| QUANTITY OF LIGHT EMITTED FROM LIGHT SOURCE | 95% | 5% | |
| PRISM REFLECTANCE | 95% | 95% | |
| TOTAL | 90.25% | 4.75% | → 19 : 1 |

◇QUANTITY OF LIGHT FLUX TRAVELING TO PHOTODETECTOR

| | S-POLARIZED LIGHT | P-POLARIZED LIGHT | |
|---|---|---|---|
| QUANTITY OF LIGHT EMITTED FROM LIGHT SOURCE | 95% | 5% | |
| PRISM REFLECTANCE | 5% | 5% | |
| TOTAL | 4.75% | 0.25% | → 19 : 1 |

※QUANTITY OF LIGHT FLUX TRAVELING TO PHOTODETECTOR (S-POLARIZED LIGHT COMPONENT ONLY)

| LASER POLARIZED LIGHT COMPONENT | | S-REFLECTANCE IN FILM CHARACTERISTIC IN DICHROIC PRISM | | | | | | | | | | |
|---|---|---|---|---|---|---|---|---|---|---|---|---|
| P | S | 1 | 0.99 | 0.98 | 0.97 | 0.96 | 0.95 | 0.94 | 0.93 | 0.92 | 0.91 | 0.9 |
| 1 | 1 | 1 | 0.99 | 0.98 | 0.97 | 0.96 | 0.95 | 0.94 | 0.93 | 0.92 | 0.91 | 0.9 |
| 0.01 | 0.99 | 0.99 | 0.9801 | 0.9702 | 0.9603 | 0.9504 | 0.9405 | 0.9306 | 0.9207 | 0.9108 | 0.9009 | 0.891 |
| 0.02 | 0.98 | 0.98 | 0.9702 | 0.9604 | 0.9506 | 0.9408 | 0.931 | 0.9212 | 0.9114 | 0.9016 | 0.8918 | 0.882 |
| 0.03 | 0.97 | 0.97 | 0.9603 | 0.9506 | 0.9409 | 0.9312 | 0.9215 | 0.9118 | 0.9021 | 0.8924 | 0.8827 | 0.873 |
| 0.04 | 0.96 | 0.96 | 0.9504 | 0.9408 | 0.9312 | 0.9216 | 0.912 | 0.9024 | 0.8928 | 0.8332 | 0.8736 | 0.864 |
| 0.05 | 0.95 | 0.95 | 0.9405 | 0.931 | 0.9215 | 0.912 | 0.9025 | 0.893 | 0.8835 | 0.874 | 0.8645 | 0.855 |
| 0.06 | 0.94 | 0.94 | 0.9306 | 0.9212 | 0.9118 | 0.9024 | 0.893 | 0.8836 | 0.8742 | 0.8648 | 0.8554 | 0.846 |
| 0.07 | 0.93 | 0.93 | 0.9207 | 0.9114 | 0.9021 | 0.8928 | 0.8835 | 0.8742 | 0.8649 | 0.8556 | 0.8463 | 0.837 |
| 0.08 | 0.92 | 0.92 | 0.9108 | 0.9016 | 0.8924 | 0.8832 | 0.874 | 0.8648 | 0.8556 | 0.8464 | 0.8372 | 0.828 |
| 0.09 | 0.91 | 0.91 | 0.9009 | 0.8918 | 0.8827 | 0.8736 | 0.8645 | 0.8554 | 0.8463 | 0.8372 | 0.8281 | 0.819 |
| 0.1 | 0.9 | 0.9 | 0.891 | 0.882 | 0.873 | 0.864 | 0.855 | 0.846 | 0.837 | 0.828 | 0.819 | 0.81 |

FIG. 21(B)

※QUANTITY OF LIGHT FLUX TRAVELING TO PROJECTION LENS (S-POLARIZED LIGHT COMPONENT ONLY)

| S-REFLECTANCE IN FILM CHARACTERISTIC IN DICHROIC PRISM | | | | | | | | | | |
|---|---|---|---|---|---|---|---|---|---|---|
| 1 | 0.99 | 0.98 | 0.97 | 0.96 | 0.95 | 0.94 | 0.93 | 0.92 | 0.91 | 0.9 |
| 1 | 0.99 | 0.98 | 0.97 | 0.96 | 0.95 | 0.94 | 0.93 | 0.92 | 0.91 | 0.9 |
| 0.99 | 0.9801 | 0.9702 | 0.9603 | 0.9504 | 0.9405 | 0.9306 | 0.9207 | 0.9108 | 0.9009 | 0.891 |
| 0.98 | 0.9702 | 0.9604 | 0.9506 | 0.9408 | 0.931 | 0.9212 | 0.9114 | 0.9016 | 0.8918 | 0.882 |
| 0.97 | 0.9603 | 0.9506 | 0.9409 | 0.9312 | 0.9215 | 0.9118 | 0.9021 | 0.8924 | 0.8827 | 0.873 |
| 0.96 | 0.9504 | 0.9408 | 0.9312 | 0.9216 | 0.912 | 0.9024 | 0.8928 | 0.8332 | 0.8736 | 0.864 |
| 0.95 | 0.9405 | 0.931 | 0.9215 | 0.912 | 0.9025 | 0.893 | 0.8835 | 0.874 | 0.8645 | 0.855 |
| 0.94 | 0.9306 | 0.9212 | 0.9118 | 0.9024 | 0.893 | 0.8836 | 0.8742 | 0.8648 | 0.8554 | 0.846 |
| 0.93 | 0.9207 | 0.9114 | 0.9021 | 0.8928 | 0.8835 | 0.8742 | 0.8649 | 0.8556 | 0.8463 | 0.837 |
| 0.92 | 0.9108 | 0.9016 | 0.8924 | 0.8832 | 0.874 | 0.8648 | 0.8556 | 0.8464 | 0.8372 | 0.828 |
| 0.91 | 0.9009 | 0.8918 | 0.8827 | 0.8736 | 0.8645 | 0.8554 | 0.8463 | 0.8372 | 0.8281 | 0.819 |
| 0.9 | 0.891 | 0.882 | 0.873 | 0.864 | 0.855 | 0.846 | 0.837 | 0.828 | 0.819 | 0.81 |

※QUANTITY OF LIGHT FLUX TRAVELING TO PHOTODETECTOR (P-POLARIZED LIGHT COMPONENT ONLY)

| LASER POLARIZED LIGHT COMPONENT | | P-REFLECTANCE IN FILM CHARACTERISTIC IN DICHROIC PRISM | | | | | | | | | | |
|---|---|---|---|---|---|---|---|---|---|---|---|---|
| P | S | 0 | 0.1 | 0.2 | 0.3 | 0.4 | 0.5 | 0.6 | 0.7 | 0.8 | 0.9 | 1 |
| 1 | 1 | 0 | 0 | 0 | 0 | 0 | 0 | 0 | 0 | 0 | 0 | 0 |
| 0.01 | 0.99 | 0.01 | 0.009 | 0.008 | 0.007 | 0.006 | 0.005 | 0.004 | 0.003 | 0.002 | 0.001 | 0 |
| 0.02 | 0.98 | 0.02 | 0.018 | 0.016 | 0.014 | 0.012 | 0.01 | 0.008 | 0.006 | 0.004 | 0.002 | 0 |
| 0.03 | 0.97 | 0.03 | 0.027 | 0.024 | 0.021 | 0.018 | 0.015 | 0.012 | 0.009 | 0.006 | 0.003 | 0 |
| 0.04 | 0.96 | 0.04 | 0.036 | 0.032 | 0.028 | 0.024 | 0.02 | 0.016 | 0.012 | 0.008 | 0.004 | 0 |
| 0.05 | 0.95 | 0.05 | 0.045 | 0.04 | 0.035 | 0.03 | 0.025 | 0.02 | 0.015 | 0.01 | 0.005 | 0 |
| 0.06 | 0.94 | 0.06 | 0.054 | 0.048 | 0.042 | 0.036 | 0.03 | 0.024 | 0.018 | 0.012 | 0.006 | 0 |
| 0.07 | 0.93 | 0.07 | 0.063 | 0.056 | 0.049 | 0.042 | 0.035 | 0.028 | 0.021 | 0.014 | 0.007 | 0 |
| 0.08 | 0.92 | 0.08 | 0.072 | 0.064 | 0.056 | 0.048 | 0.04 | 0.032 | 0.024 | 0.016 | 0.008 | 0 |
| 0.09 | 0.91 | 0.09 | 0.081 | 0.072 | 0.063 | 0.054 | 0.045 | 0.036 | 0.027 | 0.018 | 0.009 | 0 |
| 0.1 | 0.9 | 0.1 | 0.09 | 0.08 | 0.06 | 0.06 | 0.05 | 0.04 | 0.03 | 0.02 | 0.01 | 0 |

FIG. 21(C)

※QUANTITY OF LIGHT FLUX TRAVELING TO PROJECTION LENS (P-POLARIZED LIGHT COMPONENT ONLY)

| P-REFLECTANCE IN FILM CHARACTERISTIC IN DICHROIC PRISM | | | | | | | | | | |
|---|---|---|---|---|---|---|---|---|---|---|
| 0 | 0.1 | 0.2 | 0.3 | 0.4 | 0.5 | 0.6 | 0.7 | 0.8 | 0.9 | 1 |
| 0 | 0 | 0 | 0 | 0 | 0 | 0 | 0 | 0 | 0 | 0 |
| 0 | 0.01 | 0.002 | 0.003 | 0.004 | 0.005 | 0.006 | 0.007 | 0.008 | 0.009 | 0.001 |
| 0 | 0.02 | 0.004 | 0.006 | 0.008 | 0.01 | 0.012 | 0.014 | 0.016 | 0.018 | 0.002 |
| 0 | 0.03 | 0.006 | 0.009 | 0.012 | 0.015 | 0.018 | 0.021 | 0.024 | 0.027 | 0.003 |
| 0 | 0.04 | 0.008 | 0.012 | 0.016 | 0.02 | 0.024 | 0.028 | 0.032 | 0.036 | 0.004 |
| 0 | 0.05 | 0.01 | 0.015 | 0.02 | 0.025 | 0.03 | 0.035 | 0.04 | 0.045 | 0.005 |
| 0 | 0.06 | 0.012 | 0.018 | 0.024 | 0.03 | 0.036 | 0.042 | 0.048 | 0.054 | 0.006 |
| 0 | 0.07 | 0.014 | 0.021 | 0.028 | 0.035 | 0.042 | 0.049 | 0.056 | 0.063 | 0.007 |
| 0 | 0.08 | 0.016 | 0.024 | 0.032 | 0.04 | 0.048 | 0.056 | 0.064 | 0.072 | 0.008 |
| 0 | 0.09 | 0.018 | 0.027 | 0.036 | 0.045 | 0.054 | 0.063 | 0.072 | 0.081 | 0.009 |
| 0 | 0.1 | 0.02 | 0.03 | 0.04 | 0.05 | 0.06 | 0.06 | 0.08 | 0.09 | 0.01 |

<S-REFLECTION IS FIXED AT 95%>

■QUANTITY OF LIGHT FLUX TRAVELING TO PHOTODETECTOR (P-POLARIZED LIGHT+S-POLARIZED LIGHT) AT NORMAL TEMPERATURE

| LASER POLARIZED LIGHT COMPONENT | | P-REFLECTANCE IN FILM CHARACTERISTIC IN DICHROIC PRISM | | | | | | | | | | |
|---|---|---|---|---|---|---|---|---|---|---|---|---|
| P | S | 0 | 0.1 | 0.2 | 0.3 | 0.4 | 0.5 | 0.6 | 0.7 | 0.8 | 0.9 | 1 |
| 1 | 1 | 0.05 | 0.05 | 0.05 | 0.05 | 0.05 | 0.05 | 0.05 | 0.05 | 0.05 | 0.05 | 0.05 |
| 0.01 | 0.99 | 0.0595 | 0.0585 | 0.0575 | 0.0565 | 0.0555 | 0.0545 | 0.0535 | 0.0525 | 0.0515 | 0.0505 | 0.0495 |
| 0.02 | 0.98 | 0.069 | 0.067 | 0.065 | 0.063 | 0.061 | 0.059 | 0.057 | 0.055 | 0.053 | 0.051 | 0.049 |
| 0.03 | 0.97 | 0.0785 | 0.0755 | 0.0725 | 0.0695 | 0.0665 | 0.0635 | 0.0605 | 0.0575 | 0.0545 | 0.0515 | 0.0485 |
| 0.04 | 0.96 | 0.088 | 0.084 | 0.08 | 0.076 | 0.072 | 0.068 | 0.064 | 0.06 | 0.056 | 0.052 | 0.048 |
| 0.05 | 0.95 | 0.0975 | 0.0925 | 0.0875 | 0.0825 | 0.0775 | 0.0725 | 0.0675 | 0.0625 | 0.0575 | 0.0525 | 0.0475 |
| 0.06 | 0.94 | 0.107 | 0.101 | 0.095 | 0.089 | 0.083 | 0.077 | 0.071 | 0.065 | 0.059 | 0.053 | 0.047 |
| 0.07 | 0.93 | 0.1165 | 0.1095 | 0.1025 | 0.0955 | 0.0885 | 0.0815 | 0.0745 | 0.0675 | 0.0605 | 0.0535 | 0.465 |
| 0.08 | 0.92 | 0.126 | 0.118 | 0.11 | 0.102 | 0.094 | 0.086 | 0.078 | 0.07 | 0.062 | 0.054 | 0.046 |
| 0.09 | 0.91 | 0.1355 | 0.1265 | 0.1175 | 0.1085 | 0.0995 | 0.0905 | 0.0815 | 0.0725 | 0.0635 | 0.0545 | 0.0455 |
| 0.1 | 0.9 | 0.145 | 0.135 | 0.125 | 0.115 | 0.105 | 0.095 | 0.085 | 0.075 | 0.065 | 0.055 | 0.45 |

FIG. 22(B)

■QUANTITY OF LIGHT FLUX TRAVELING TO PROJECTION LENS (P-POLARIZED LIGHT+S-POLARIZED LIGHT) AT NORMAL TEMPERATURE

| P | S | P-REFLECTANCE IN FILM CHARACTERISTIC IN DICHROIC PRISM | | | | | | | | | | |
|---|---|---|---|---|---|---|---|---|---|---|---|---|
| | | 0 | 0.1 | 0.2 | 0.3 | 0.4 | 0.5 | 0.6 | 0.7 | 0.8 | 0.9 | 1 |
| 1 | 1 | 0.95 | 0.95 | 0.95 | 0.95 | 0.95 | 0.95 | 0.95 | 0.95 | 0.95 | 0.95 | 0.95 |
| 0.01 | 0.99 | 0.9405 | 0.9415 | 0.9425 | 0.9435 | 0.9445 | 0.9455 | 0.9465 | 0.9475 | 0.9485 | 0.9495 | 0.9505 |
| 0.02 | 0.98 | 0.931 | 0.933 | 0.935 | 0.937 | 0.939 | 0.941 | 0.943 | 0.945 | 0.947 | 0.949 | 0.951 |
| 0.03 | 0.97 | 0.9215 | 0.9245 | 0.9275 | 0.9305 | 0.9335 | 0.9365 | 0.9395 | 0.9425 | 0.9455 | 0.9485 | 0.9515 |
| 0.04 | 0.96 | 0.912 | 0.916 | 0.92 | 0.924 | 0.928 | 0.932 | 0.936 | 0.94 | 0.944 | 0.948 | 0.952 |
| 0.05 | 0.95 | 0.9025 | 0.9075 | 0.9125 | 0.9175 | 0.9225 | 0.9275 | 0.9325 | 0.9375 | 0.9425 | 0.9475 | 0.9525 |
| 0.06 | 0.94 | 0.893 | 0.899 | 0.905 | 0.911 | 0.917 | 0.923 | 0.929 | 0.935 | 0.941 | 0.947 | 0.953 |
| 0.07 | 0.93 | 0.8835 | 0.8905 | 0.8975 | 0.9045 | 0.9115 | 0.9185 | 0.9255 | 0.9325 | 0.9395 | 0.9465 | 0.9535 |
| 0.08 | 0.92 | 0.874 | 0.882 | 0.89 | 0.898 | 0.906 | 0.914 | 0.922 | 0.93 | 0.938 | 0.946 | 0.954 |
| 0.09 | 0.91 | 0.8645 | 0.8735 | 0.8825 | 0.8915 | 0.9005 | 0.9095 | 0.9185 | 0.9275 | 0.9365 | 0.9455 | 0.9545 |
| 0.1 | 0.9 | 0.855 | 0.865 | 0.875 | 0.885 | 0.895 | 0.905 | 0.915 | 0.925 | 0.935 | 0.945 | 0.955 |

<S-REFLECTION IS FIXED AT 95%>

■QUANTITY OF LIGHT FLUX TRAVELING TO PHOTODETECTOR (P-POLARIZED LIGHT+S-POLARIZED LIGHT) AT TEMPERATURE HIGHER BY 10°C

| LASER POLARIZED LIGHT COMPONENT | | P-REFLECTANCE IN FILM CHARACTERISTIC IN DICHROIC PRISM | | | | | | | | | | |
|---|---|---|---|---|---|---|---|---|---|---|---|---|
| P | S | 0 | 0.1 | 0.2 | 0.3 | 0.4 | 0.5 | 0.6 | 0.7 | 0.8 | 0.9 | 1 |
| 1 | 1 | 0.045 | 0.045 | 0.045 | 0.045 | 0.045 | 0.045 | 0.045 | 0.045 | 0.045 | 0.045 | 0.045 |
| 0.01 | 0.99 | 0.0526 | 0.0518 | 0.051 | 0.0502 | 0.0494 | 0.0486 | 0.0478 | 0.047 | 0.0462 | 0.0454 | 0.0446 |
| 0.02 | 0.98 | 0.0601 | 0.0585 | 0.0569 | 0.0553 | 0.0537 | 0.0521 | 0.0505 | 0.0489 | 0.0473 | 0.0457 | 0.0441 |
| 0.03 | 0.97 | 0.0677 | 0.0653 | 0.0629 | 0.0605 | 0.0581 | 0.0557 | 0.0533 | 0.0509 | 0.0485 | 0.0461 | 0.0437 |
| 0.04 | 0.96 | 0.0752 | 0.072 | 0.0688 | 0.0656 | 0.0624 | 0.0592 | 0.056 | 0.0528 | 0.0496 | 0.0464 | 0.0432 |
| 0.05 | 0.95 | 0.0828 | 0.0788 | 0.0748 | 0.0708 | 0.0668 | 0.0628 | 0.0588 | 0.0548 | 0.0508 | 0.0468 | 0.0428 |
| 0.06 | 0.94 | 0.0903 | 0.0855 | 0.0807 | 0.0759 | 0.0711 | 0.0663 | 0.0615 | 0.0567 | 0.0519 | 0.0471 | 0.0423 |
| 0.07 | 0.93 | 0.0979 | 0.0923 | 0.0867 | 0.0811 | 0.0755 | 0.0699 | 0.0643 | 0.0587 | 0.0531 | 0.0475 | 0.0419 |
| 0.08 | 0.92 | 0.1054 | 0.099 | 0.0926 | 0.0862 | 0.0798 | 0.0734 | 0.067 | 0.0606 | 0.0542 | 0.0478 | 0.0414 |
| 0.09 | 0.91 | 0.113 | 0.1058 | 0.0986 | 0.0914 | 0.0842 | 0.077 | 0.0698 | 0.0626 | 0.0554 | 0.0482 | 0.041 |
| 0.1 | 0.9 | 0.1205 | 0.1125 | 0.1045 | 0.0965 | 0.0885 | 0.0805 | 0.0725 | 0.0645 | 0.0565 | 0.0485 | 0.0405 |

FIG. 22(C)

■QUANTITY OF LIGHT FLUX TRAVELING TO PROJECTION LENS (P-POLARIZED LIGHT+S-POLARIZED LIGHT) AT TEMPERATURE HIGHER BY 10°C

| P | S | P-REFLECTANCE IN FILM CHARACTERISTIC IN DICHROIC PRISM | | | | | | | | | | |
|---|---|---|---|---|---|---|---|---|---|---|---|---|
| | | 0 | 0.1 | 0.2 | 0.3 | 0.4 | 0.5 | 0.6 | 0.7 | 0.8 | 0.9 | 1 |
| 1 | 1 | 0.855 | 0.855 | 0.855 | 0.855 | 0.855 | 0.855 | 0.855 | 0.855 | 0.855 | 0.855 | 0.855 |
| 0.01 | 0.99 | 0.8465 | 0.8473 | 0.8481 | 0.8489 | 0.8497 | 0.8505 | 0.8513 | 0.8521 | 0.8529 | 0.8537 | 0.8545 |
| 0.02 | 0.98 | 0.8379 | 0.8395 | 0.8411 | 0.8427 | 0.8443 | 0.8459 | 0.8475 | 0.8491 | 0.8507 | 0.8523 | 0.8539 |
| 0.03 | 0.97 | 0.8294 | 0.8318 | 0.8342 | 0.8366 | 0.839 | 0.8414 | 0.8438 | 0.8462 | 0.8486 | 0.851 | 0.8534 |
| 0.04 | 0.96 | 0.8208 | 0.8208 | 0.8208 | 0.8208 | 0.8208 | 0.8208 | 0.8208 | 0.8208 | 0.8208 | 0.8208 | 0.8208 |
| 0.05 | 0.95 | 0.8123 | 0.8163 | 0.8203 | 0.8243 | 0.8283 | 0.8323 | 0.8363 | 0.8403 | 0.8443 | 0.8483 | 0.8523 |
| 0.06 | 0.94 | 0.8037 | 0.8085 | 0.8133 | 0.8181 | 0.8229 | 0.8277 | 0.8325 | 0.8373 | 0.8421 | 0.8469 | 0.8517 |
| 0.07 | 0.93 | 0.7952 | 0.8008 | 0.8064 | 0.812 | 0.8176 | 0.8232 | 0.8288 | 0.8344 | 0.84 | 0.8456 | 0.8512 |
| 0.08 | 0.92 | 0.7866 | 0.793 | 0.7994 | 0.8058 | 0.8122 | 0.8186 | 0.825 | 0.8314 | 0.8378 | 0.8442 | 0.8506 |
| 0.09 | 0.91 | 0.7781 | 0.7853 | 0.7925 | 0.7997 | 0.8069 | 0.8141 | 0.8213 | 0.8285 | 0.8357 | 0.8429 | 0.8501 |
| 0.1 | 0.9 | 0.7695 | 0.7775 | 0.7855 | 0.7935 | 0.8015 | 0.8095 | 0.8175 | 0.8255 | 0.8335 | 0.8415 | 0.8495 |

<S-REFLECTION IS FIXED AT 95%>

※QUANTITY OF LIGHT FLUX TRAVELING TO PHOTODETECTOR (HIGH TEMPERATURE/NORMAL TEMPERATURE)

| LASER POLARIZED LIGHT COMPONENT | | P-REFLECTANCE IN FILM CHARACTERISTIC IN DICHROIC PRISM | | | | | | | | | | |
|---|---|---|---|---|---|---|---|---|---|---|---|---|
| P | S | 0 | 0.1 | 0.2 | 0.3 | 0.4 | 0.5 | 0.6 | 0.7 | 0.8 | 0.9 | 1 |
| 1 | 1 | 0.9 | 0.9 | 0.9 | 0.9 | 0.9 | 0.9 | 0.9 | 0.9 | 0.9 | 0.9 | 0.9 |
| 0.01 | 0.99 | 0.8832 | 0.8846 | 0.8861 | 0.8876 | 0.8892 | 0.8908 | 0.8925 | 0.8943 | 0.8961 | 0.898 | 0.9 |
| 0.02 | 0.98 | 0.871 | 0.8731 | 0.8754 | 0.8778 | 0.8803 | 0.8831 | 0.886 | 0.8891 | 0.8925 | 0.8961 | 0.9 |
| 0.03 | 0.97 | 0.8618 | 0.8642 | 0.8669 | 0.8698 | 0.8729 | 0.8764 | 0.8802 | 0.8843 | 0.889 | 0.8942 | 0.9 |
| 0.04 | 0.96 | 0.8545 | 0.8571 | 0.86 | 0.8632 | 0.8667 | 0.8706 | 0.875 | 0.88 | 0.8857 | 0.8923 | 0.9 |
| 0.05 | 0.95 | 0.8487 | 0.8514 | 0.8543 | 0.8576 | 0.8613 | 0.8655 | 0.8704 | 0.876 | 0.8826 | 0.8905 | 0.9 |
| 0.06 | 0.94 | 0.8439 | 0.8465 | 0.8495 | 0.8528 | 0.8566 | 0.861 | 0.8662 | 0.8723 | 0.8797 | 0.8887 | 0.9 |
| 0.07 | 0.93 | 0.8399 | 0.8425 | 0.8454 | 0.8487 | 0.8525 | 0.8571 | 0.8624 | 0.8639 | 0.8769 | 0.8869 | 0.9 |
| 0.08 | 0.92 | 0.8365 | 0.839 | 0.8418 | 0.8451 | 0.8489 | 0.8535 | 0.859 | 0.8657 | 0.8742 | 0.8852 | 0.9 |
| 0.09 | 0.91 | 0.8336 | 0.836 | 0.8387 | 0.8419 | 0.8457 | 0.8503 | 0.8558 | 0.8628 | 0.8717 | 0.8835 | 0.9 |
| 0.1 | 0.9 | 0.831 | 0.8333 | 0.836 | 0.8391 | 0.8429 | 0.8474 | 0.8529 | 0.86 | 0.8692 | 0.8818 | 0.9 |

FIG. 23(B)

※QUANTITY OF LIGHT FLUX TRAVELING TO PROJECTION LENS (HIGH TEMPERATURE/NORMAL TEMPERATURE)

| P | S | P-REFLECTANCE IN FILM CHARACTERISTIC IN DICHROIC PRISM | | | | | | | | | | |
|---|---|---|---|---|---|---|---|---|---|---|---|---|
| | | 0 | 0.1 | 0.2 | 0.3 | 0.4 | 0.5 | 0.6 | 0.7 | 0.8 | 0.9 | 1 |
| 1 | 1 | 0.9 | 0.9 | 0.9 | 0.9 | 0.9 | 0.9 | 0.9 | 0.9 | 0.9 | 0.9 | 0.9 |
| 0.01 | 0.99 | 0.9 | 0.8999 | 0.8998 | 0.8997 | 0.8996 | 0.8995 | 0.8994 | 0.8993 | 0.8992 | 0.8991 | 0.8989 |
| 0.02 | 0.98 | 0.9 | 0.8998 | 0.8996 | 0.8994 | 0.8991 | 0.8989 | 0.8987 | 0.8985 | 0.8983 | 0.8981 | 0.8979 |
| 0.03 | 0.97 | 0.9 | 0.8997 | 0.8994 | 0.899 | 0.8987 | 0.8984 | 0.8981 | 0.8978 | 0.8975 | 0.8972 | 0.8968 |
| 0.04 | 0.96 | 0.9 | 0.8996 | 0.8991 | 0.8987 | 0.8983 | 0.8979 | 0.8974 | 0.897 | 0.8966 | 0.8962 | 0.8958 |
| 0.05 | 0.95 | 0.9 | 0.8994 | 0.8989 | 0.8984 | 0.8978 | 0.8973 | 0.8968 | 0.8963 | 0.8958 | 0.8953 | 0.8948 |
| 0.06 | 0.94 | 0.9 | 0.8993 | 0.8987 | 0.898 | 0.8974 | 0.8967 | 0.8961 | 0.8955 | 0.8949 | 0.8943 | 0.8937 |
| 0.07 | 0.93 | 0.9 | 0.8992 | 0.8984 | 0.8977 | 0.8969 | 0.8962 | 0.8955 | 0.8947 | 0.894 | 0.8933 | 0.8927 |
| 0.08 | 0.92 | 0.9 | 0.8991 | 0.8982 | 0.8973 | 0.8965 | 0.8956 | 0.8948 | 0.894 | 0.8932 | 0.8924 | 0.8916 |
| 0.09 | 0.91 | 0.9 | 0.809 | 0.808 | 0.807 | 0.806 | 0.8051 | 0.8041 | 0.8032 | 0.8023 | 0.8014 | 0.8006 |
| 0.1 | 0.9 | 0.9 | 0.8988 | 0.8977 | 0.8966 | 0.8955 | 0.8945 | 0.8934 | 0.8924 | 0.8914 | 0.8905 | 0.8895 |

<S-REFLECTION IS FIXED AT 95%>

※RATIO BETWEEN LIGHT-QUANTITY CHANGE RATE ON PROJECTION LENS SIDE AND THAT ON PHOTODETECTOR SIDE (PROJECTION LENS/LIGHT RECEIVING DEVICE) AT TEMPERATURE HIGHER BY 25°C

| LASER POLARIZED LIGHT COMPONENT | | P-REFLECTANCE IN FILM CHARACTERISTIC IN DICHROIC PRISM | | | | | | | | | | |
|---|---|---|---|---|---|---|---|---|---|---|---|---|
| P | S | 0 | 0.1 | 0.2 | 0.3 | 0.4 | 0.5 | 0.6 | 0.7 | 0.8 | 0.9 | 1 |
| 1 | 1 | 0.00 | 0.00 | 0.00 | 0.00 | 0.00 | 0.00 | 0.00 | 0.00 | 0.00 | 0.00 | 0.00 |
| 0.01 | 0.99 | 4.76 | 4.32 | 3.87 | 3.40 | 2.92 | 2.43 | 1.92 | 1.39 | 0.85 | 0.29 | -0.29 |
| 0.02 | 0.98 | 8.32 | 7.62 | 6.91 | 6.15 | 5.34 | 4.50 | 3.60 | 2.65 | 1.64 | 0.56 | -0.58 |
| 0.03 | 0.97 | 11.09 | 10.25 | 9.36 | 8.41 | 7.38 | 6.28 | 5.09 | 3.79 | 2.38 | 0.33 | -0.88 |
| 0.04 | 0.96 | 13.30 | 12.37 | 11.38 | 10.29 | 9.12 | 7.83 | 6.41 | 4.84 | 3.08 | 1.09 | -1.17 |
| 0.05 | 0.95 | 15.11 | 14.12 | 13.06 | 11.89 | 10.61 | 9.18 | 7.58 | 5.78 | 3.72 | 1.34 | -1.46 |
| 0.06 | 0.94 | 16.61 | 15.59 | 14.48 | 13.25 | 11.89 | 10.37 | 8.64 | 6.65 | 4.33 | 1.58 | -1.75 |
| 0.07 | 0.93 | 17.88 | 16.84 | 15.70 | 14.43 | 13.02 | 11.42 | 9.58 | 7.44 | 4.90 | 1.91 | -2.04 |
| 0.08 | 0.92 | 18.90 | 17.91 | 16.74 | 15.45 | 14.00 | 12.34 | 10.43 | 8.16 | 5.43 | 2.03 | -2.33 |
| 0.09 | 0.91 | 19.92 | 18.84 | 17.66 | 16.84 | 14.86 | 13.17 | 11.19 | 8.82 | 5.93 | 2.25 | -2.62 |
| 0.1 | 0.9 | 20.75 | 19.65 | 18.46 | 17.12 | 15.62 | 13.90 | 11.87 | 9.43 | 6.39 | 2.45 | -2.91 |

FIG. 23(C)

ILLUMINATION UNIT AND DISPLAY

CROSS REFERENCE TO RELATED APPLICATIONS

The present application is a continuation of U.S. patent application Ser. No. 15/407,853, filed on Jan. 17, 2017, which is a continuation of U.S. patent application Ser. No. 15/050,322, filed Feb. 22, 2016 (now U.S. Pat. No. 9,584,779), which is a continuation of U.S. patent application Ser. No. 13/540,740, filed on Jul. 3, 2012 (now U.S. Pat. No. 9,285,101), which claims priority from Japanese patent application 2011-153485 filed on Jul. 12, 2011. Each of the above applications are incorporated herein by reference in their entirety.

BACKGROUND

The disclosure relates to an illumination unit that emits light including a laser beam, and a display that displays an image by using such an illumination unit.

In general, an optical module, which is one of main parts of a projector (a projection-type display), is configured to have an illumination optical system (an illumination unit) and a projection optical system. The illumination optical system includes a light source, and the projection optical system includes a light modulation device. In the field of such a projector, small (palmtop) and lightweight portable projectors called "micro-projector" have become widespread in recent years. In this micro-projector, LED (Light Emitting Diode) has been mainly used as the light source of the illumination unit.

Meanwhile, lately, lasers have been receiving attention as a new type of light source for the illumination unit. For instance, following the commercialization of high-output blue semiconductor lasers and red semiconductor lasers, development of green semiconductor lasers has been underway and is about to reach a practical level. Against this backdrop, there has been suggested a projector in which single-color lasers (semiconductor lasers) for three primary colors of red (R), green (G), and blue (B) are used as a light source of the illumination unit. Use of the single-color laser as the light source makes it possible to obtain a projector in which a color reproduction range is wide and power consumption is low.

Further, in recent years, there has been a demand for improvements in size (downsizing) and brightness of portable projectors. This is because, in existing small semiconductor lasers, although output is considered to be high, brightness tends to be insufficient. Therefore, development of semiconductor lasers with higher output has been vigorously pursued.

SUMMARY

Among the projectors using the laser as the light source as described above, a projector that monitors a part of illumination light by using a photodetector (a light sensing device) has been suggested (for example, see Japanese Unexamined Patent Application Publication No. 2001-343703). As for the semiconductor laser, for instance, a characteristic usually changes depending on a temperature change, aging degradation, and the like. Therefore, it is necessary to correct a current fed into the semiconductor laser, so as to achieve desired display luminance (brightness). For this reason, in one of techniques for such correction, a photodetector is disposed in an optical system of the projector, and a part of a laser beam (illumination light) is monitored to detect a light quantity, and thereby an emitted light quantity is controlled to be kept constant.

However, when the part of the outgoing beam (the illumination light) from the laser light source is monitored as described above, it is not easy to respond to a temperature change in the light quantity distribution in some cases, making it difficult to perform accurate light control. Therefore, there is desired suggestion of a technique that reduces variations in the quantity of the illumination light, which are caused by the temperature changes in the light quantity distribution of the laser beam, when the part of the illumination light from the laser serving as the light source is monitored.

It is desirable to provide an illumination unit and a display which are capable of reducing variations in the quantity of illumination light.

According to an embodiment of the disclosure, there is provided an illumination unit including: a light source section including a laser light source; an optical-path branching device outputting light incident from the light source section, by branching the light into an outgoing optical path of illumination light and other optical path; a photodetector receiving a light flux that travels on the other optical path; a control section controlling an emitted light quantity in the laser light source, based on a quantity of the light flux received by the photodetector; and a light-quantity-distribution control device disposed between the optical-path branching device and the photodetector on the other optical path, the light-quantity-distribution control device controlling a light quantity distribution in the light flux to be incident upon the photodetector.

According to an embodiment of the disclosure, there is provided a display including an illumination unit that emits illumination light, and a light modulation device that modulates the illumination light based on an image signal. The illumination unit includes: a light source section including a laser light source; an optical-path branching device outputting light incident from the light source section, by branching the light into an outgoing optical path of illumination light and other optical path; a photodetector receiving a light flux traveling on the other optical path; a control section controlling an emitted light quantity in the laser light source, based on a quantity of the light flux received by the photodetector; and a light-quantity-distribution control device disposed between the optical-path branching device and the photodetector on the other optical path, the light-quantity-distribution control device controlling a light quantity distribution in the light flux to be incident upon the photodetector.

In the illumination unit and the display according to the above-described embodiments of the disclosure, the light incident from the light source section upon the optical-path branching device is branched into the outgoing optical path of the illumination light and the other optical path, and the branched light is outputted. The light flux traveling on the other optical path is received by the photodetector, and the emitted light quantity in the laser light source is controlled based on the quantity of this received light flux. Here, the light quantity distribution in the light flux to be incident upon the photodetector is controlled by the light-quantity-distribution control device disposed between the optical-path branching device and the photodetector on the other optical path. This makes the light quantity distribution in the light flux incident upon the photodetector become less likely to vary, even when the light quantity distribution in the laser beam emitted from the light source changes depending on the temperature. Thus, accuracy of controlling the emitted light quantity in the laser light source improves.

According to the illumination unit and the display in the above-described embodiments of the technology, the light-quantity-distribution control device is provided between the optical-path branching device and the photodetector on the other optical path different from the outgoing optical path of the illumination light. The light-quantity-distribution control device controls the light quantity distribution in the light flux to be incident upon the photodetector. Therefore, in a case where a temperature change occurs in the light quantity distribution of the laser beam, the accuracy of controlling the emitted light quantity in the laser light source is enhanced. Hence, light-quantity variations in the illumination light are reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 7A to 7C are diagrams each illustrating an example of temperature characteristics in the light quantity distribution of the incident light flux depicted in FIG. 6.

FIGS. 8A and 8B are diagrams illustrating an optical path example of each light beam in the light flux incident upon the photodetector according to the comparative example, and that according to Example 1, respectively.

FIGS. 9A and 9B are diagrams illustrating an example of the light quantity distribution of the light flux incident upon the photodetector according to the comparative example, and that according to Example 1, respectively.

FIGS. 13A and 13B are diagrams illustrating an example of the light quantity distribution of the side lobe light on the photodetector according to the comparative example, and that according to Example 2, respectively.

FIG. 16 is a diagram illustrating an example of the light quantity for each polarized component in each of the illumination light and the light (incident light flux) traveling to the photodetector.

FIG. 17 is a diagram illustrating an example of a temperature change in the light quantity for each polarized component in light emitted from a laser.

FIG. 19 is a diagram illustrating an example of reflection and transmission characteristics for each polarized component in a reflection transmission film depicted in FIG. 18.

FIGS. 21(A), 21(B), 21(C) and 21(D) are diagrams illustrating a light quantity for each polarized component in each of the illumination light and the light traveling to the photodetector, according to Example 3.

FIGS. 22(A), 22(B), 22(C) and 22(D) are diagrams illustrating temperature characteristics of the light quantity in each of the illumination light and the light traveling to the photodetector, according to Example 3.

FIGS. 23(A), 23(B) and 23(C) are diagrams illustrating a temperature change rate of the light quantity in each of the illumination light and the light traveling to the photodetector, according to Example 3.

DETAILED DESCRIPTION

Embodiments of the disclosure will be described below in detail with reference to the drawings. It is to be noted that the description will be provided in the following order.

1. First embodiment (an example in which a coupling lens is used as a light-quantity-distribution control device)
2. Second embodiment (an example in which a diffusion device is used as a light-quantity-distribution control device)
3. Third embodiment (an example in which a polarizing device controlling polarized components of light traveling to a photodetector is provided)
4. Fourth embodiment (an example 1 in which characteristics of a reflection transmission film of a dichroic prism is adjusted)
5. Fifth embodiment (an example 2 in which characteristics of a reflection transmission film of a dichroic prism is adjusted)
6. Modifications

[First Embodiment]

[Configuration of Display 3]

Figure 1:
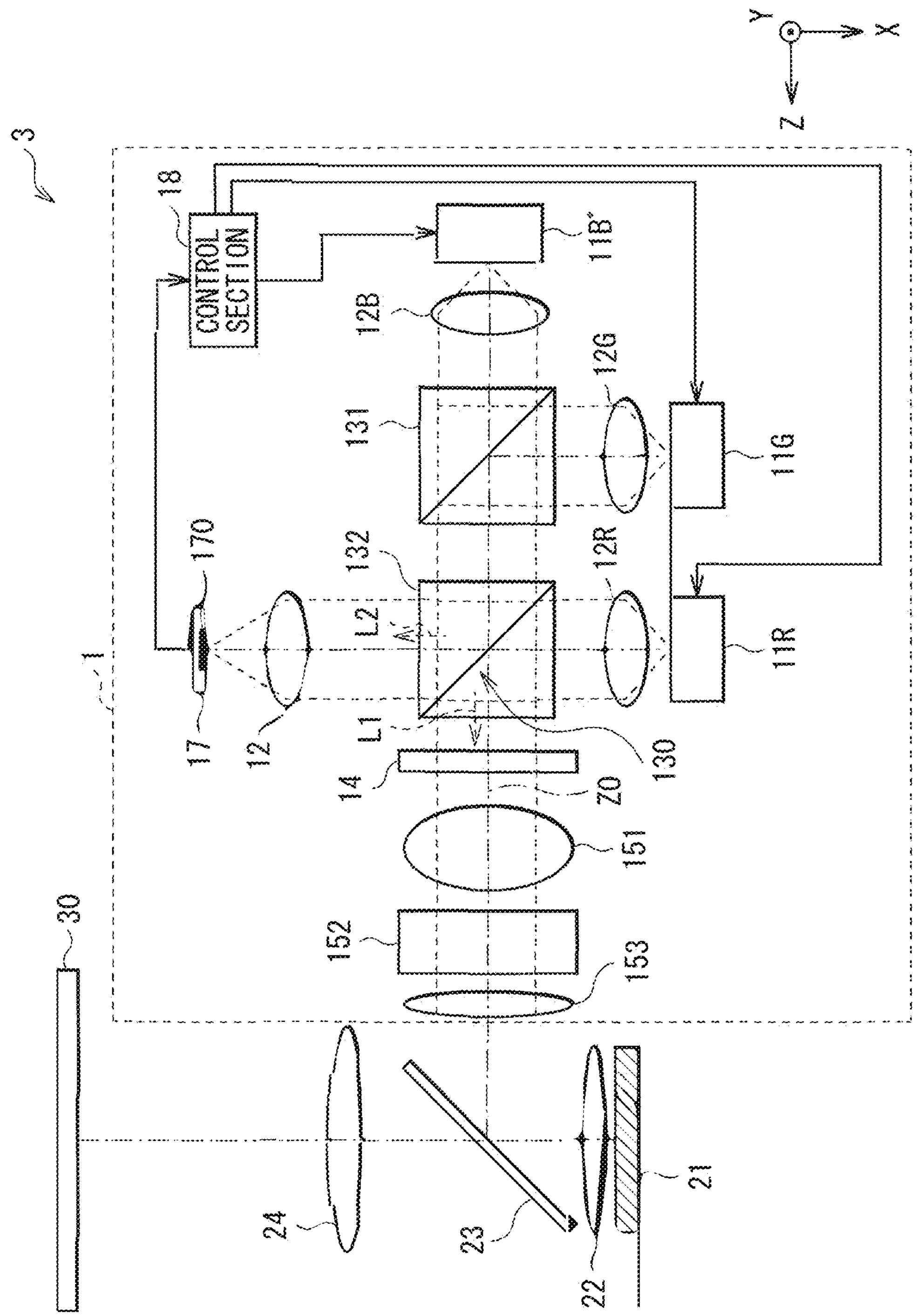
FIG. 1 is a diagram illustrating an overall configuration of a display according to a first embodiment of the disclosure.

FIG. 1 illustrates an overall configuration of a display (a display 3) according to a first embodiment of the disclosure. The display 3 is a projection-type display that projects an image (image light) onto a screen 30 (a projection surface). The display 3 includes an illumination unit 1, and an optical system (a display optical system) provided to perform image display by using illumination light from the illumination unit 1.

(Illumination Unit 1)

The illumination unit 1 includes a red laser 11R, a green laser 11G, a blue laser 11B, coupling lenses 12R, 12G, and 12B, dichroic prisms 131 and 132, an optical device 14, a collimator lens 151, a fly-eye lens 152, and a condensing lens 153. The illumination unit 1 further includes a coupling lens 12, a photodetector (a light sensing device) 17, and a control section 18. It is to be noted that Z0 in FIG. 1 indicates an optical axis.

The red laser 11R, the green laser 11G, and the blue laser 11B are three kinds of light sources emitting a red laser beam, a green laser beam, a blue laser beam, respectively. These light sources form a light source section, and here, each of these three kinds of light sources is a laser light source. The red laser 11R, the green laser 11G, and the blue laser 11B each perform pulse emission, for example. In other words, each of the red laser 11R, the green laser 11G, and the blue laser 11B outputs a laser beam intermittently, at a predetermined emission frequency (an emission period), for example. Each of the red laser 11R, the green laser 11G, and the blue laser 11B is, for instance, a semiconductor laser, a solid-state laser, or the like. It is to be noted that when each of these laser light sources is the semiconductor laser, for instance, a wavelength $\lambda r$ of the red laser beam is about 600 to about 700 nm, a wavelength $\lambda g$ of the green laser beam is about 500 to about 600 nm, and a wavelength $\lambda b$ of the blue laser beam is about 400 to about 500 nm.

The coupling lenses 12G and 12B are provided to collimate the green laser beam emitted from the green laser 11G and the blue laser beam emitted from the blue laser 11B (to release these laser beams as parallel beams), and couple the collimated beams to the dichroic prism 131. Similarly, the coupling lens 12R is provided to collimate the red laser beam emitted from the red laser 11R (to release this laser beam as a parallel beam), and couple the collimated beam to the dichroic prism 132. It to be noted that, here, the laser beams being incident are each collimated (to serve as the parallel beam) by the coupling lenses 12R, 12G, and 12B, but are not limited to this example, and may not be collimated (may not become the parallel beams) by the coupling lenses 12R, 12G, and 12B. Nevertheless, collimating the laser beams as described above leads to a reduction in size of the unit configuration and thus is more preferable.

The dichroic prism 131 selectively reflects the green laser beam entering through the coupling lens 12G, while selectively allowing the blue laser beam entering through the coupling lens 12B to pass therethrough. The dichroic prism 132 selectively reflects the red laser beam entering through the coupling lens 12R, while selectively allowing the blue laser beam and the green laser beam outputted from the dichroic prism 131 to pass therethrough. This realizes color composition (optical path synthesis) of the red laser beam, the green laser beam, and the blue laser beam.

The dichroic prism 132 also functions as an optical-path branching device. This optical-path branching device branches the laser beams of the respective colors incident from the red laser 11R, the green laser 11G, and the blue laser 11B, into an outgoing optical path L1 of the illumination light and a light-receiving optical path L2 (other optical path) to the photodetector 17 which will be described later. The optical-path branching device then outputs the branched laser beams. Such a function of serving as the optical-path branching device is realized by a reflection transmission film 130 disposed on adhesion surfaces of a pair of prisms therebetween. The reflection transmission film 130 is configured by forming a multilayer film in which dielectric materials having different refractive indexes such as titanium oxide ($TiO_2$) and silicon oxide ($SiO_2$) are laminated, for example. The multilayer film is formed like a mirror surface. The reflection transmission film 130 provides an optical reflectance and an optical transmittance with respect to the incident light. It is to be noted that since the optical reflectance in this dichroic prism 132 is about a few percent which is low, most of the light travels on the outgoing optical path L1 and is used as the illumination light.

The optical device 14 is disposed on an optical path between the light source and the fly-eye lens 152 (specifically, between the dichroic prism 132 and the collimator lens 151 on the outgoing optical path L1). The optical device 14 is provided to reduce a so-called speckle noise (an interference pattern). The laser beam traveling on the outgoing optical path L1 passes through this optical device 14. Specifically, the optical device 14 is caused to vibrate (to perform micro vibration) by a drive section which is not illustrated (for example, the optical device 14 is caused to vibrate in a direction along the optical axis Z0 or a direction orthogonal to the optical axis Z0), and thereby the speckle noise is reduced.

The collimator lens 151 is disposed between the optical device 14 and the fly-eye lens 152 on the outgoing optical path L1, and collimates the light outputted from the optical device 14 to release the light as a parallel beam.

The fly-eye lens 152 is an optical member (an integrator) in which a plurality of lenses are arranged two-dimensionally on a substrate, and outputs an incident light flux after spatially dividing this light flux according to an arrangement of these lenses. Thus, the light outputted from this fly-eye lens 152 is made uniform (an in-plane intensity distribution is made uniform), and outputted as the illumination light.

The condensing lens 153 is provided to condense the incident light (the illumination light) which has been made uniform by the fly-eye lens 152.

The coupling lens 12 is disposed between the dichroic prism 132 and the photodetector 17 on the light-receiving optical path L2, and functions as a refractive device with positive power. This allows the coupling lens 12 to control a light quantity distribution in a light flux to be incident upon the photodetector 17, as will be described later in detail. This coupling lens 12 corresponds to a specific but not limitative example of "light-quantity-distribution control device" in the disclosure.

The photodetector 17 is a device receiving the light flux traveling along the light-receiving optical path L2, on a light-receiving surface 170, and functions as a light quantity detector that detects (monitors) the quantity of the light flux. The photodetector 17 includes the light-receiving surface 170. The light-receiving surface 17 is sufficiently smaller than a cross-sectional area of the light flux (i.e., a beam area) traveling on the light-receiving optical path L2, so as to prevent detection of excess light including stray light on the optical path and light reflected from a reflection-type liquid crystal device 21, as will be described later.

The control section 18 controls an emitted light quantity in the red laser 11R, the green laser 11G, and the blue laser 11B, based on the quantity of the light flux received by the photodetector 17 (i.e. the control section 18 serves as an automatic power controller). Specifically, the control section 18 controls the emitted light quantity in the red laser 11R, the green laser 11G, and the blue laser 11B, so that the emitted light quantity becomes substantially constant (desirably, constant), without depending on a temperature change. Here, specifically, for instance, the control section 18 feeds the detected light quantity back to each of the red laser 11R, the green laser 11G, and the blue laser 11B, and then controls the voltage of each of the laser light sources after performing I-V (current-voltage) conversion.

(Display Optical System)

The display optical system mentioned above is configured using a polarization beam splitter (PBS) 23, a field lens 22, the reflection-type liquid crystal device 21, and a projection lens 24 (a projection optical system).

The polarization beam splitter 23 is an optical member that selectively allows specific polarized light (e.g., P-polarized light) to pass therethrough, while selectively reflecting other polarized light (e.g., S-polarized light). Thus, the illumination light (e.g., the S-polarized light) from the illumination unit 1 is selectively reflected and incident upon the reflection-type liquid crystal device 21, while the image light (e.g., the P-polarized light) outputted from this reflecting liquid crystal device 21 selectively passes through the polarization beam splitter 23 and is then incident upon the projection lens 24.

The field lens 22 is disposed on an optical path between the polarization beam splitter 23 and the reflection-type liquid crystal device 21. The field lens 22 is provided to reduce the size of the optical system, by causing tencentric incidence of the illumination light upon the reflection-type liquid crystal device 21.

The reflection-type liquid crystal device 21 is a light modulation device that outputs the image light, by reflecting the illumination light from the illumination unit 1 while modulating this illumination light based on an image signal supplied from the display control section which is not illustrated. Here, in the reflection-type liquid crystal device 21, the illumination light is reflected so that the polarized light (e.g., the S-polarized light or the P-polarized light) when incident and that when outputted are different from each other. This reflection-type liquid crystal device 21 is, for example, a liquid crystal device such as LCOS (Liquid Crystal On Silicon).

The projection lens 24 is provided to project (perform magnified projection of) the illumination light (the image light) modulated by the reflection-type liquid crystal device 21, onto the screen 30.

[Function and Effects of Display 3]

(1. Display Operation)

In this display 3, first, the light (the laser beams) emitted from the red laser 11R, the green laser 11G, and the blue laser 11B are collimated by the coupling lenses 12R, 12G, and 12B, respectively, to become the parallel beams in the illumination unit 1, as illustrated in FIG. 1. Then, each of the laser beams (the red laser beam, the green laser beam, and the blue laser beam) which have thus become the parallel beams are subjected to the color composition (the optical path synthesis) by the dichroic prisms 131 and 132. Upon the optical path synthesis, each of the laser beams passes through the optical device 14, and is then collimated by the collimator lens 151 to become the parallel beam. The parallel beam is then incident upon the fly-eye lens 152. This incident light is made uniform (the in-plane intensity distribution is made uniform) by the fly-eye lens 152. The incident light made uniform is then outputted to be condensed by the condensing lens 153. In this way, the illumination light is outputted from the illumination unit 1.

Subsequently, the illumination light is selectively reflected by the polarization beam splitter 23, to be incident upon the reflection-type liquid crystal device 21 through the field lens 22. In the reflection-type liquid crystal device 21, the incident light is reflected while being modulated based on the image signal, and thereby the incident light is outputted as the image light. Here, in this reflection-type liquid crystal device 21, the polarized light when incident and the polarized light when outputted are different. Therefore, the image light outputted from the reflection-type liquid crystal device 21 passes through the polarization beam splitter 23 selectively, and is then incident upon the projection lens 24. This incident light (the image light) is projected (subjected to the magnified projection) by the projection lens 24, onto the screen 30.

At this time, each of the red laser 11R, the green laser 11G, and the blue laser 11B performs intermittent emission of light at a predetermined emission frequency, for example. This allows each of the laser beams (the red laser beam, the green laser beam, and the blue laser beam) to be outputted sequentially in a time-divisional manner. Then, in the reflection-type liquid crystal device 21, the laser beam of the corresponding color is sequentially modulated in a time-divisional manner, based on the image signal of each of color components (a red component, a green component, and a blue component). In this way, a color image is displayed based on the image signals in the display 3.

(2. Light Receiving Operation, and Operation of Controlling Amount of Outgoing Beam)

In this illumination unit 1, each of the laser beams incident from the red laser 11R, the green laser 11G, and the blue laser 11B upon the dichroic prism 132 is outputted, after being branched into the outgoing optical path L1 of the illumination light and the light-receiving optical path L2. The light flux traveling on the light-receiving optical path L2 is received by the photodetector 17 through the coupling lens 12. Based on the quantity of this received light flux, the control section 18 controls the emitted light quantity in the red laser 11R, the green laser 11G, and the blue laser 11B. Specifically, the emitted light quantity in each of the red laser 11R, the green laser 11G, and the blue laser 11B is controlled by the control section 18 to be substantially constant (desirably, constant) without depending on temperature changes. This stabilizes light-emitting operation in each of the red laser 11R, the green laser 11G, and the blue laser 11B. As a result, an improvement is made to color reproduction characteristics in displaying the image, and reductions in color unevenness as well as flickering are achieved. The quality of the displayed image is thereby enhanced.

(3. Function of Characteristic Part)

Next, function of a characteristic part (function of the illumination unit 1) in the present embodiment will be described in detail, while making a comparison with a comparative example.

Figure 2A:
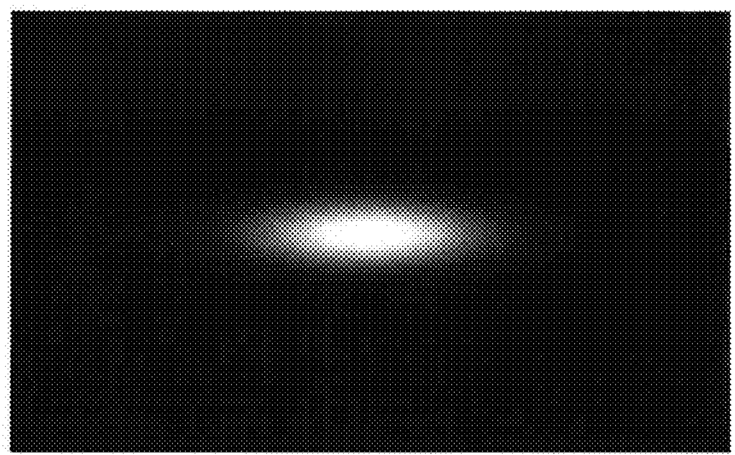
FIGS. 2A and 2B are diagrams illustrating an example of an ideal light quantity distribution in a laser beam.
Figure 2B:
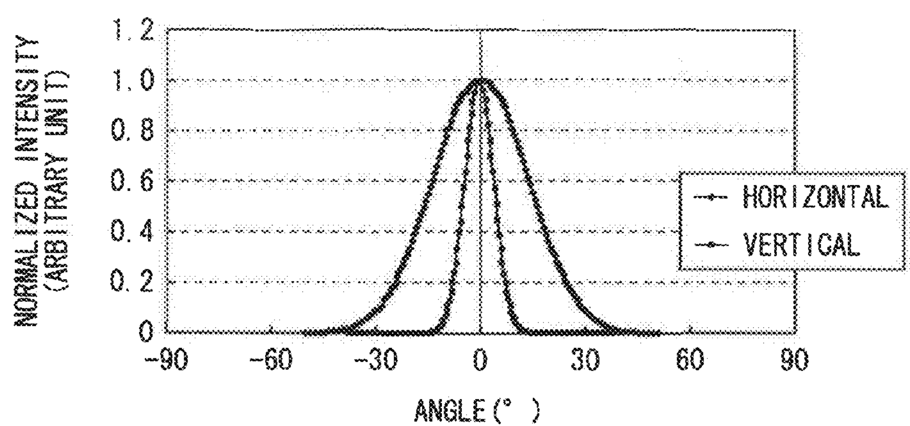
Figure 3A:
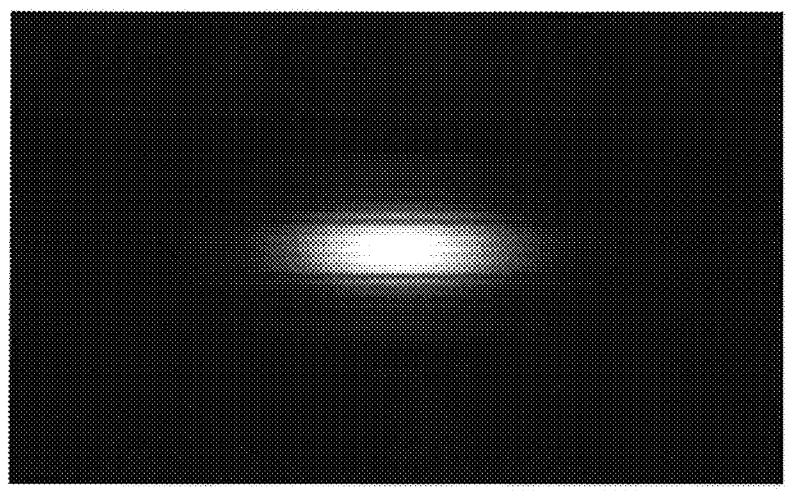
FIGS. 3A and 3B are diagrams illustrating an example of an actual light quantity distribution in a laser beam.
Figure 3B:
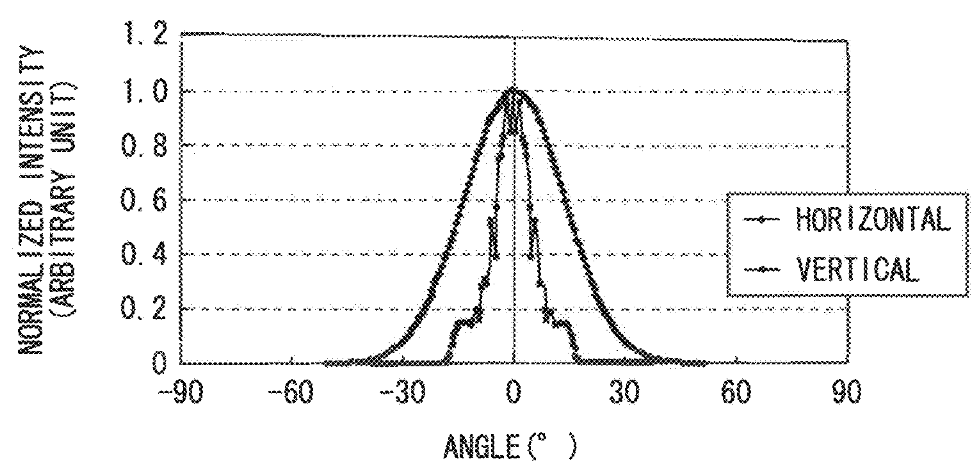

First, the laser beam is generated by entrance of exciting light into a laser medium made of a laser crystal. An intensity distribution (a light quantity distribution, FFP (Far Field Pattern)) of this laser beam is determined according to a distribution of atoms or molecules of the laser crystal serving as the laser medium, and the size of the crystal. Ideally, the light quantity distribution of the generated laser beam is substantially a Gaussian distribution, as illustrated in FIGS. 2A and 2B, for example. In reality however, a light quantity distribution (a profile) of a laser beam generated by a currently available laser is what is illustrated in FIGS. 3A and 3B, for example. In other words, unlike the one illustrated in FIGS. 2A and 2B, this light quantity distribution is not a complete Gaussian distribution, and there are cracks appearing in the profile as well as in the vicinity of a peak, and side lobes are formed. It is to be noted that "horizontal" and "vertical" in each of FIG. 2B and FIG. 3B indicate the light quantity distribution along the horizontal direction and that along the vertical direction, respectively, and this indication will remain the same hereinafter. In a comparative example which will be described below, such an unstable (incomplete) light quantity distribution in the laser light source results in a disadvantage, with regard to stabilization of light-emitting operation by a photodetector 17 and a control section 18.

(3-1. Comparative Example)

Figure 4:
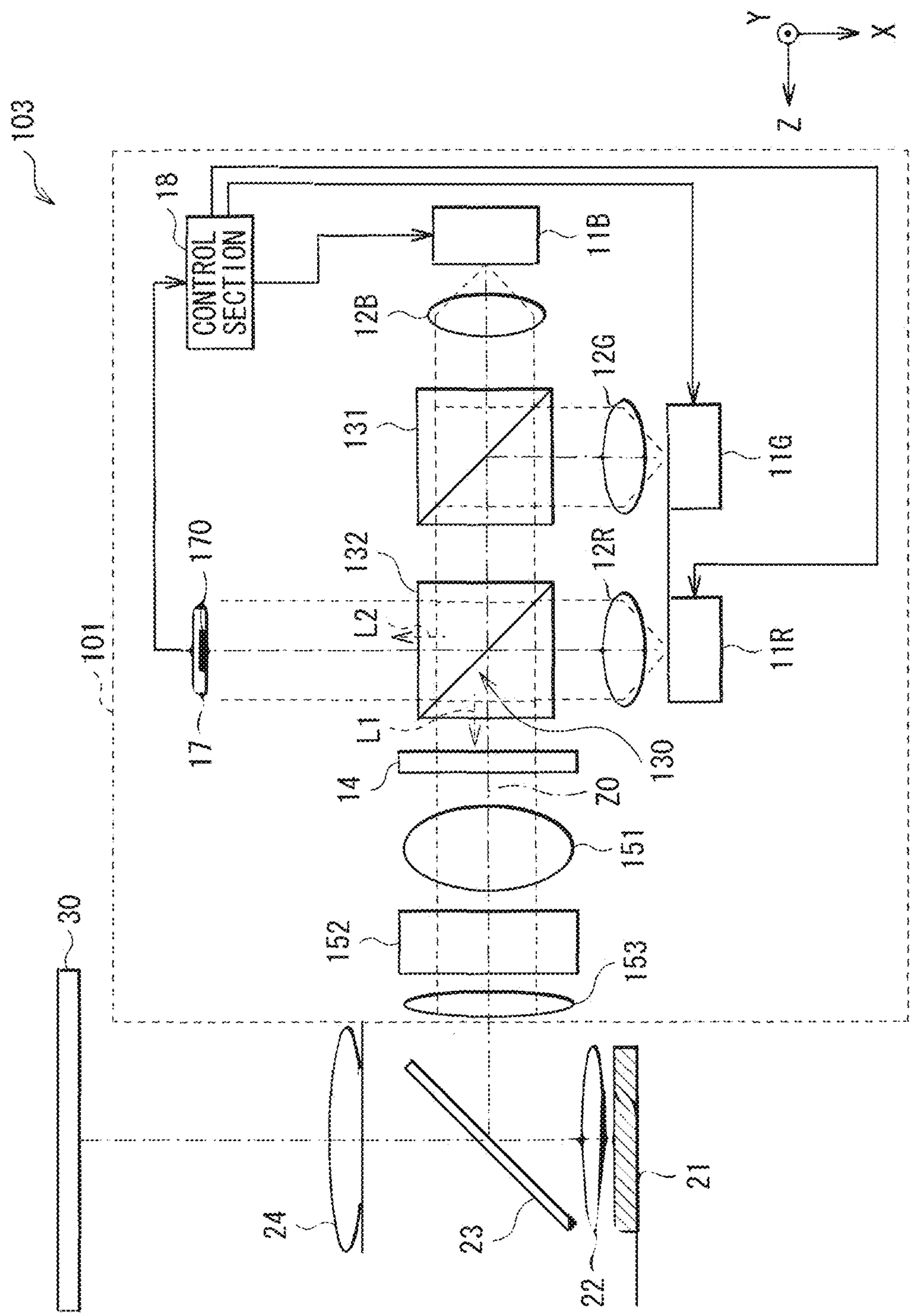
FIG. 4 is a diagram illustrating an overall configuration of a display according to a comparative example.

FIG. 4 illustrates an overall configuration of a display (a display 103) according to the comparative example. The display 103 of this comparative example is a projection-type display that projects image light onto a screen 30, like the display 3 of the present embodiment. This display 103 includes an illumination unit 101 having no coupling lens 12, in place of the illumination unit 1 having the coupling lens 12, and is otherwise similar in configuration to the display 3.

Figure 5:
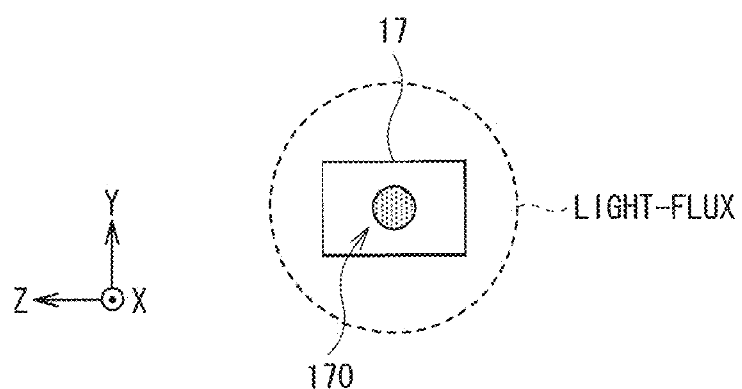
FIG. 5 is a schematic diagram illustrating an example of a relationship between a light-receiving surface of a photodetector and an incident light flux depicted in FIG. 4.

In the illumination unit 101 of this comparative example, the photodetector 17 has a light-receiving surface 170 sufficiently smaller than a cross-sectional area (a beam area) of a light flux traveling on a light-receiving optical path L2, as illustrated in FIG. 5, for example. This is to prevent detection of excess light such as stray light in an optical path and light reflected from a reflection-type liquid crystal device 21.

Figure 6A:
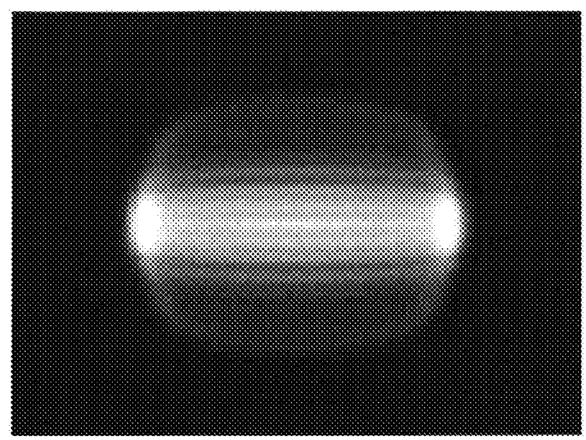
FIGS. 6A and 6B are diagrams illustrating an example of a light quantity distribution of the incident light flux depicted in FIG. 5.
Figure 6B:
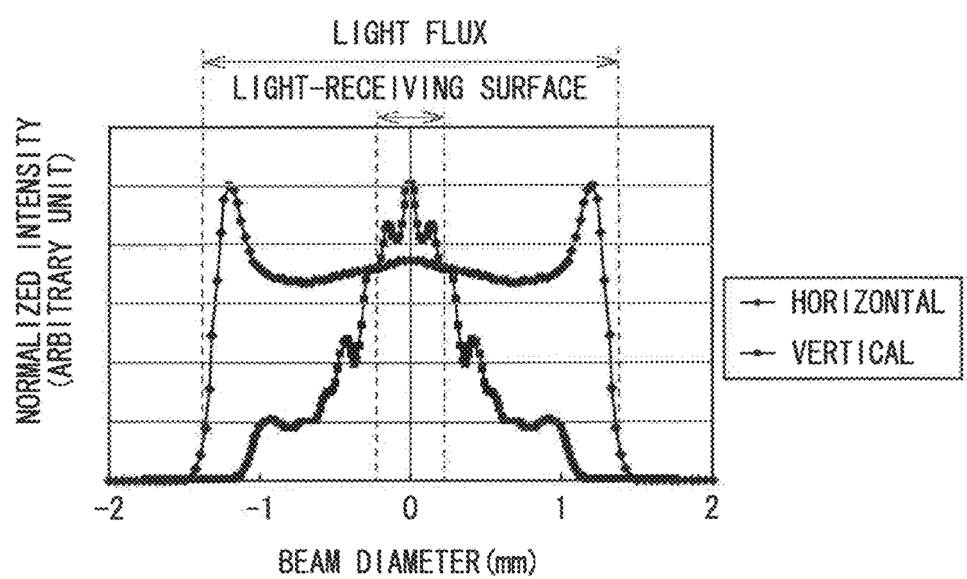

Here, each of a red laser 11R, a green laser 11G, and a blue laser 11B is assumed to have a light quantity distribution (a profile) similar to that in FIGS. 3A and 3B. As illustrated in FIGS. 6A and 6B, for example, only a part (specifically, in the vicinity of a central part) of the light quantity distribution in the light flux traveling on the light-receiving optical path L2 is considered to be monitored on the light-receiving surface 170 in the photodetector 17. It is to be noted that this example is based on a model in which diverging rays outputted from the red laser 11R, the green laser 11G, and the blue laser 11B are respectively incident upon coupling lenses 12R, 12G, and 12B each having a planoconvex spherical surface with an effective diameter ϕ of about 3 mm. Thus, each of the diverging rays becomes an outgoing light flux with a diameter ϕ of about 3 mm. Further, this example is based on a model in which a light quantity is monitored by the light-receiving surface 170 using the photodetector 17 with a diameter ϕ of about 0.5 mm, to achieve about 1/10 of the beam area.

At this moment, as illustrated in FIGS. 7A, 7B, and 7C, for example, a temperature change occurs in the light quantity distribution of the light flux traveling on the light-receiving optical path L2. This temperature change occurs because a change in the light quantity distribution (the profile) of the laser beam emitted from a laser light source takes place according to the temperature (the temperature of the laser light source). It is to be noted that FIGS. 7A, 7B, and 7C illustrate the light quantity distribution of the light flux at the temperature of the laser light source being 32° C., 37° C., and 43° C., respectively. What is apparent from these figures is as follows. In a part (in the vicinity of a central part in the light flux) where the light is received by the light-receiving surface 170 of the photodetector 17, there is almost no change in the light quantity distribution of the light flux, even when there is a change in the temperature. On the other hand, in a part (in a peripheral part) where the light is not received by the light-receiving surface 170, the light quantity distribution of the light flux changes in response to a change in the temperature. Specifically, although there is no change in the light quantity distribution depending on the temperature in the vicinity of the central part, the light quantity in the peripheral part (a side-lobe part) decreases with increasing temperature. Therefore, in the light flux as a whole, the light quantity decreases as the temperature rises.

In this comparative example, there is almost no change in the light quantity detected by the photodetector 17 even when the temperature change. Therefore, a temperature change in the quantity of the beam emitted from the laser light source is unlikely to be detected. As a result, it is difficult to perform accurate light control (stabilization of the light-emitting operation) with the control section 18, allowing a change in the quantity of the illumination light to be resulted from a temperature change in the light quantity distribution of the laser beam.

A temperature change rate in the light quantity distribution of the laser beam as described above varies according to the wavelength of the laser beam. Therefore, when the temperature changes following a state in which a color balance is adjusted at a certain temperature, the emitted light quantity in the laser beam of each color also changes. Thus, a ratio of mixing the laser beams of the respective colors also changes, making it difficult to maintain a desired color balance (a white balance).

(3-2. Function of Present Embodiment)

In contrast, in the illumination unit 1 of the present embodiment, the coupling lens 12 functioning as the light-quantity-distribution control device (the refractive device with positive power) is provided between the dichroic prism 132 and the photodetector 17 on the light-receiving optical path L2, as illustrated in FIG. 1. Thus, the light quantity distribution in the light flux to be incident upon the photodetector 17 is controlled, and an average light quantity in the light quantity distribution (an emitted light quantity distribution of the laser light source) of this incident light flux is incident upon the light-receiving surface 170 in the photodetector 17.

In the illumination unit 101 of the comparative example, the light flux traveling on the light-receiving optical path L2 is directly incident upon the photodetector 17 as the incident light flux, as illustrated in FIG. 8A, for example. As a result, on the light-receiving surface 170 in the photodetector 17, only a part (in the vicinity of the central part) of the light quantity distribution in this incident light flux is monitored, as illustrated in FIG. 9A, for example.

In contrast, in the illumination unit 1 of the present embodiment, after the light quantity in each of the vicinity of the central part and the peripheral part, in the light flux traveling on the light-receiving optical path L2, is reduced by the coupling lens 12, the light flux is incident upon the photodetector 17 as the incident light, as in Example 1 illustrated in FIG. 8B, for instance. As a result, the average light quantity in the light quantity distribution of this incident light flux is monitored on the light-receiving surface 170 in the photodetector 17, as illustrated in FIG. 9B, for example.

In this way, in the illumination unit 1, even when a change occurs in the light quantity distribution in the laser beam emitted from each of the red laser 11R, the green laser 11G, and the blue laser 11B depending on the temperature (even when the profile of the light quantity distribution varies), the light quantity distribution in the light flux incident upon the photodetector 17 is unlikely to vary. Therefore, in the illumination unit 1, there is an improvement in the accuracy of controlling the emitted light quantity in the red laser 11R, the green laser 11G, and the blue laser 11B by the control section 18.

In the present embodiment, the light-quantity-distribution control device (the coupling lens 12) that controls the light quantity distribution in the light flux to be incident upon the photodetector 17 is provided between the dichroic prism 132 and the photodetector 17 on the optical path (the light-receiving optical path L2) different from the outgoing optical path L1 of the illumination light. Therefore, in a case where a change occurs in the light quantity distribution of the laser beam depending on the temperature, the accuracy of controlling the emitted light quantity in the red laser 11R, the green laser 11G, and the blue laser 11B is allowed to be improved. Thus, light-quantity variations in the illumination light emitted from the illumination unit 1 are allowed to be reduced. As a result, even when an existing laser light source with an incomplete beam profile is used, a projector system, which is capable of performing stable image display without being affected by perturbations such as the temperature, is allowed to be implemented. Moreover, the ratio of mixing the laser beams of the respective colors is prevented from changing, and thereby a desired color balance (a white balance) is maintained.

In addition, the coupling lens 12 allows the light in a side-lobe region where a variation in the light source profile occurs to be also condensed and received by the photodetector 17. Thus, almost all the light-quantity variations, which result from variations in the profile caused by changes in the temperature, are detected by the photodetector 17. Moreover, the size of the light-receiving surface 170 in the photodetector 17 remains the same as that of an existing (ordinary) one and therefore, a configuration unaffected by the stray light is realized.

Now, other embodiments (second to fifth embodiments) according to the disclosure will be described. The same elements as those of the first embodiment will be provided with the same characters as those of the first embodiment, and the description thereof will be omitted as appropriate.

[Second Embodiment]

Figure 10:
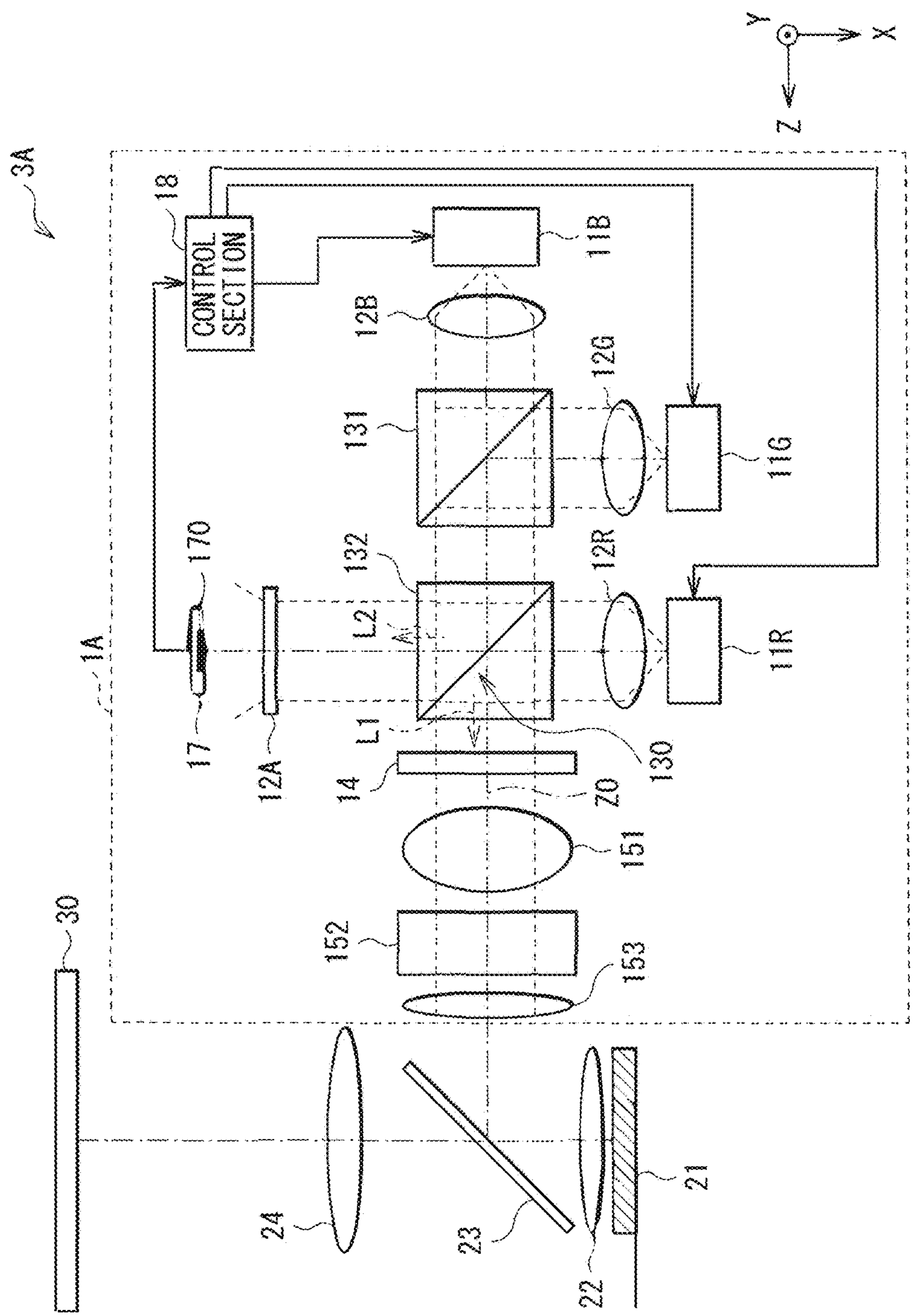
FIG. 10 is a diagram illustrating an overall configuration of a display according to a second embodiment.

FIG. 10 illustrates an overall configuration of a display (a display 3A) according to the second embodiment. The display 3A of the present embodiment is configured by providing an illumination unit 1A to be described below, in place of the illumination unit 1 in the display 3 of the first embodiment. The display 3A is otherwise similar in configuration to the display 3.

The illumination unit 1A is configured by providing a diffusion device 12A to be described below, in place of the coupling lens 12 in the illumination unit 1 of the first embodiment. The illumination unit 1A is otherwise similar in configuration to the illumination unit 1.

Figure 11A:
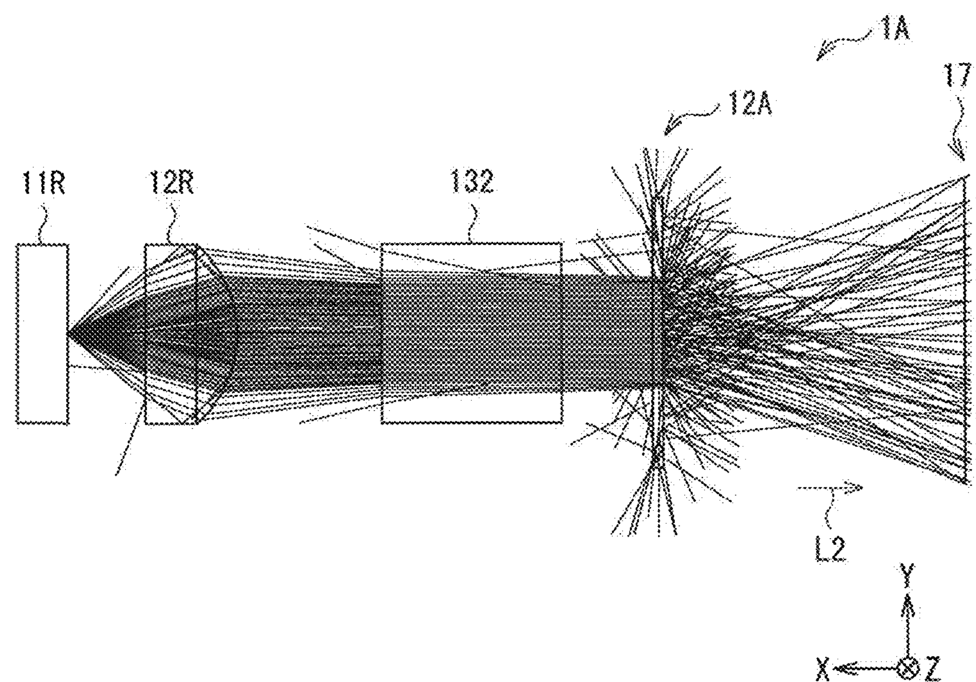
FIGS. 11A and 11B are diagrams illustrating an optical path example of each light beam in the light flux incident upon the photodetector, and an example of the light quantity distribution of the light flux incident upon the photodetector, respectively, according to Example 2.
Figure 11B:
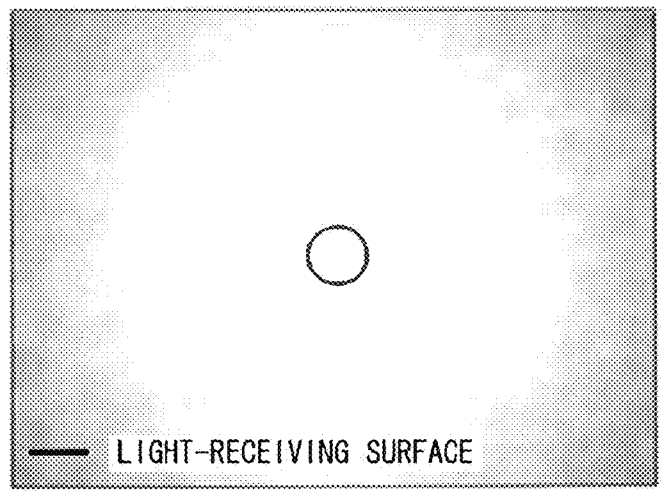

The diffusion device 12A is disposed between a dichroic prism 132 and a photodetector 17 on a light-receiving optical path L2, like the coupling lens 12. As in Example 2 illustrated in FIG. 11A, for example, the diffusion device 12A diffuses a light flux traveling on the light-receiving optical path L2, and outputs the diffused light flux. This allows the diffusion device 12A to control a light quantity distribution in a light flux to be incident upon the photodetector 17, in a manner similar to the coupling lens 12. As a result, an average light quantity in the light quantity distribution of this incident light flux is monitored on the light-receiving surface 170 in the photodetector 17, as illustrated in FIG. 11B, for example. In other words, this diffusion device 12A also corresponds to a specific but not limitative example of "light-quantity-distribution control device" in the technology.

Figure 12A:
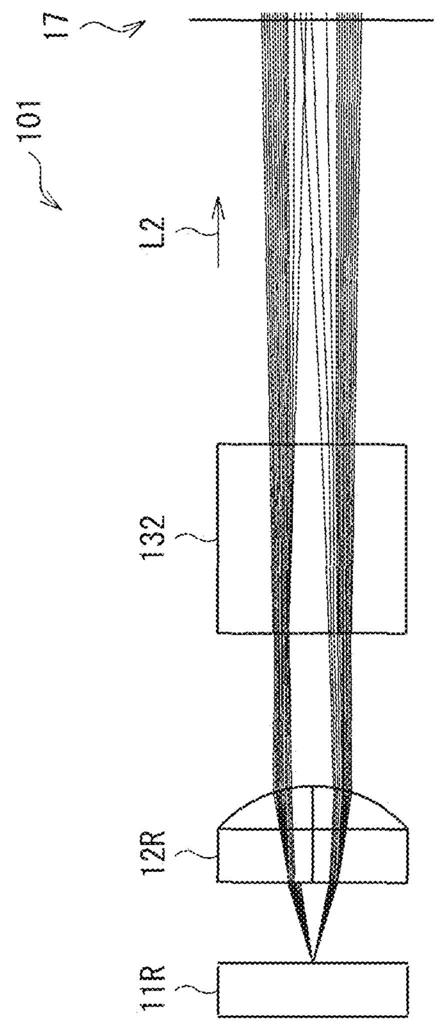
FIGS. 12A and 12B are diagrams illustrating an optical path example of side lobe light in the light flux incident upon the photodetector according to the comparative example, and that according to Example 2, respectively.
Figure 12B:
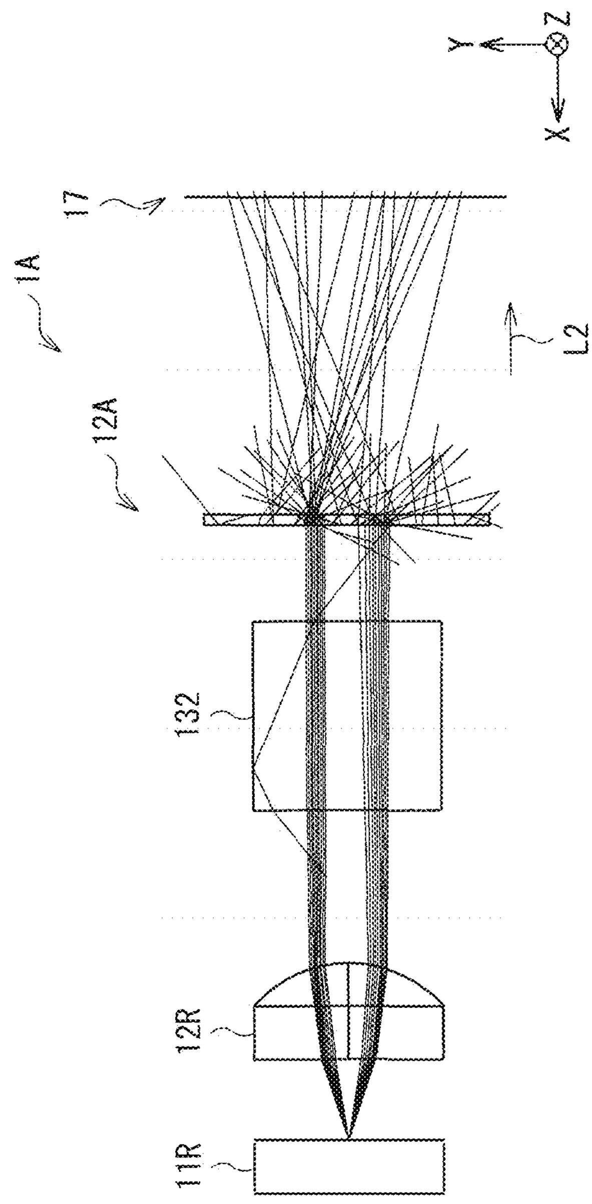

Further, since such a diffusion device 12A is provided, a side-lobe part of the incident light flux, in which part the light quantity changes greatly, is incident upon the photodetector 17 in a constant proportion, in a manner similar to a main light flux in the vicinity of a central part. This is illustrated in Example 2 depicted in FIG. 12B and FIG. 13B, for example. Therefore, it is possible to address such a disadvantage that an emitted light quantity traveling on an outgoing optical path L1 is unlikely to be held constant, because of a partial variation in a light quantity distribution. It is to be noted that in the comparative example described above, in contrast, the diffusion device 12A is not provided and thus, the side-lobe part where the light quantity changes greatly is not incident upon the photodetector 17, as illustrated in FIG. 12A and FIG. 13A, for example.

In the present embodiment, the light-quantity-distribution control device (the diffusion device 12A), which controls the light quantity distribution in the light flux to be incident upon the photodetector 17, is provided between the dichroic prism 132 and the photodetector 17 on the optical path (the light-receiving optical path L2) different from the outgoing optical path L1 of the illumination light. Therefore, effects similar to those of the first embodiment are achievable. In other words, in a case where there is a change in the light quantity distribution of the laser beam depending on the temperature, the accuracy of controlling an emitted light quantity for a red laser 11R, a green laser 11G, and a blue laser 11B is improved, and variations in the light-quantity in the illumination light outputted from the illumination unit 1A are allowed to be reduced.

[Third Embodiment]

[Configuration of Display 3B]

Figure 14:
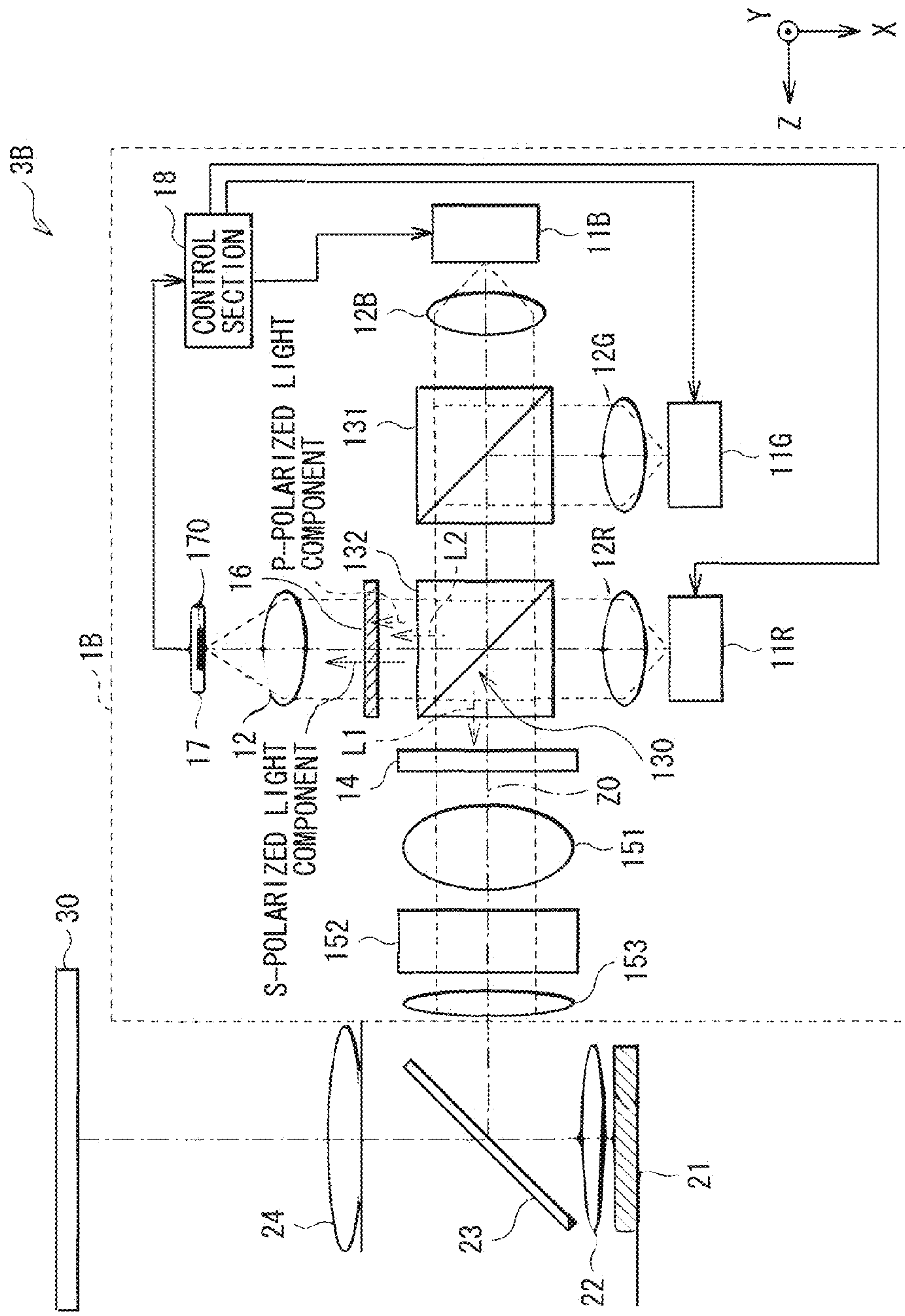
FIG. 14 is a diagram illustrating an overall configuration of a display according to a third embodiment.

FIG. 14 illustrates an overall configuration of a display (a display 3B) according to the third embodiment. The display 3B of the present embodiment is configured by providing an illumination unit 1B to be described below, in place of the illumination unit 1 in the display 3 of the first embodiment. The display 3B is otherwise similar in configuration to the display 3.

The illumination unit 1B is configured by further providing a polarizing device 16 which will be described below, between the dichroic prism 132 and the photodetector 17 on the light-receiving optical path L2 in the illumination unit 1 of the first embodiment. The illumination unit 1B is otherwise similar in configuration to the illumination unit 1. Specifically, in the present embodiment, the polarizing device 16 is disposed between a dichroic prism 132 and a coupling lens 12 on a light-receiving optical path L2, for instance.

The polarizing device 16 is disposed between the dichroic prism 132 and a photodetector 17 (specifically, between the dichroic prism 132 and the coupling lens 12) on the light-receiving optical path L2. This polarizing device 16 controls polarized components so that the same polarized component as a main polarized component (here an S-polarized light component) in illumination light relatively increases, in a light flux traveling on the light-receiving optical path L2. The polarizing device 16 corresponds to a specific but not limitative example of "optical member" in the disclosure. Specifically, as illustrated in FIG. 14, the polarizing device 16 selectively removes the polarized component (a P-polarized light component) different from the main polarized component, while selectively allowing the same polarized component (an S-polarized light component) as the main polarized component in the illumination light in the light flux traveling on the light-receiving optical path L2 to pass therethrough.

[Function and Effects of Display 3B]

In this display 3B, the following function and effects are achieved by providing the polarizing device 16 in the illumination unit 1B. First, there will be described a disadvantage ascribable to the difference in temperature characteristics (a light-quantity change rate in response to a temperature change) between the polarized components (the S-polarized light component and the P-polarized light component) in a laser beam emitted from each of a red laser 11R, a green laser 11G, and a blue laser 11B.

(Disadvantage Ascribable to Difference in Temperature Characteristics Between Polarized Components)

Figure 15A:
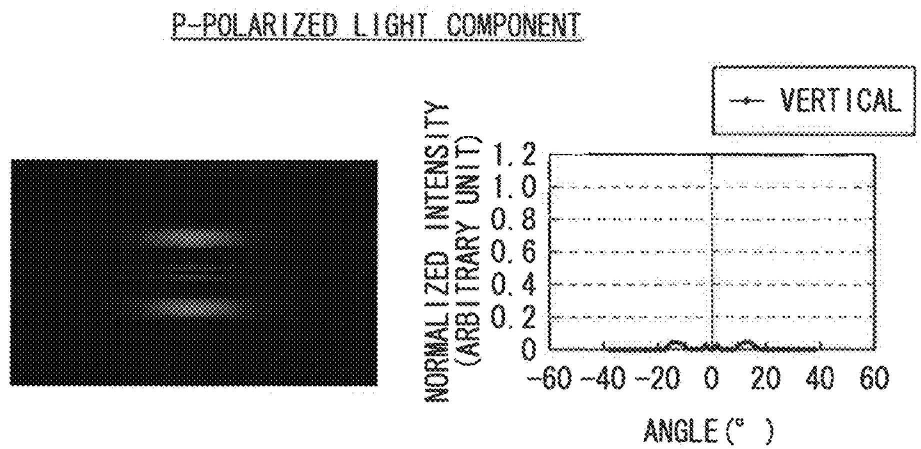
FIGS. 15A and 15B are diagrams illustrating an example of the light quantity distribution in a P-polarized light component of a laser beam, and that in an S-polarized light component of the laser beam, respectively.
Figure 15B:
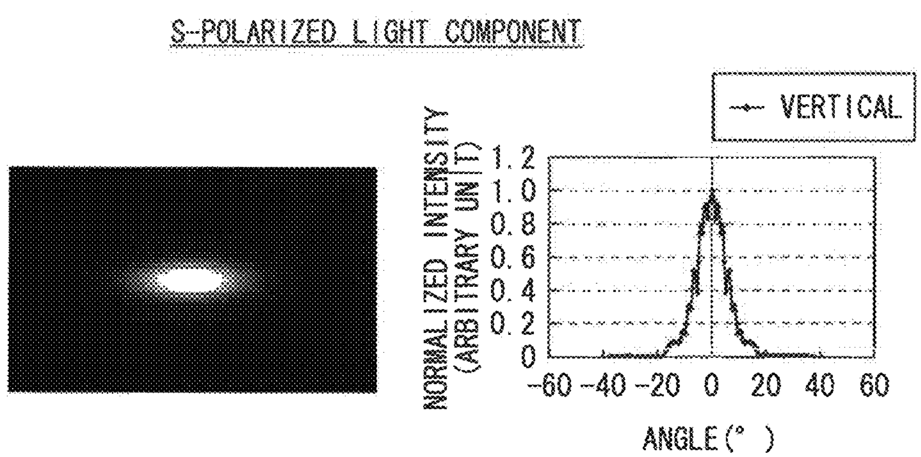

FIGS. 15A and 15B each illustrate an example of a light quantity distribution (a profile) in the laser beam emitted from each of the red laser 11R, the green laser 11G, and the blue laser 11B. Specifically, FIGS. 15A and 15B depict the P-polarized light component and the S-polarized light component, respectively. According to these light quantity distributions, the P-polarized light component illustrated in FIG. 15A is present mainly in a side-lobe region (a peripheral part) in the light flux, but is hardly present in the vicinity of a central part. On the other hand, the S-polarized light component illustrated in FIG. 15B is present mainly in the vicinity of the central part in the light flux, while being hardly present in the side-lobe region.

In the laser beam emitted from each of the red laser 11R, the green laser 11G, and the blue laser 11B, the polarized components usually exist at a ratio of the S-polarized light component to the P-polarized light component=ls:lp=95:5. In the comparative example described earlier, only the light quantity in the vicinity of the central part of the light flux traveling on the light-receiving optical path L2 is monitored. Therefore, the P-polarized light component is not incident upon the photodetector 17, and only the light quantity of the polarized component (the S-polarized light component) same as that in the light flux traveling on the outgoing optical path L1 of the illumination light is allowed to be monitored. However, when the average light quantity in the light quantity distribution of this light flux is monitored in the photodetector 17 as in the first and second embodiments, both the S-polarized light component and the P-polarized light component are incident upon the photodetector 17. Thus, the following issue arises as a result of the difference in temperature characteristics between these polarized components.

Here, as an example, there will be described a relationship between the light quantity for each polarized component in the laser beam emitted from each of the laser light sources (i.e. the quantity of the light emitted from the light source), and an optical reflectance (a prism reflectance) as well as an optical transmittance (a prism transmittance) for each polarized component in the dichroic prism 132, as illustrated in FIG. 16. Specifically, there will be described a ratio between the light quantity of the illumination light (the light flux traveling on the outgoing optical path L1) and the light quantity of the light flux traveling to the photodetector 17 (on the light-receiving optical path L2). This ratio is ascribable to the above-mentioned relationship.

At first, in the dichroic prism 132, the optical reflectance for the S-polarized light component, of which light quantity is dominant in the emitted laser beam as described above, is relatively higher than the optical reflectance for the P-polarized light component, so that the laser beam emitted from each of the laser light sources is handled efficiently as the illumination light. Specifically, as illustrated in FIG. 16, reflection and transmission characteristics in a reflection transmission film 130 are set to provide about 95% (0.95) of a prism reflectance Rs for the S-polarized light component, and about 25% (0.25) of a prism reflectance Rp for the P-polarized light component. Further, a prism transmittance (1−Rs) for the S-polarized light component is about 5% (0.05), and a prism transmittance (1−Rp) for the P-polarized light component is about 75% (0.75). Here, the light quantity of each of the light fluxes after light-path branching in this dichroic prism 132 is also illustrated in FIG. 16, assuming that the quantity of the light emitted from the light source is about 100%, in the case of ls:lp=about 95:5 as mentioned above. In other words, in the light quantity of the illumination light, the polarized components are distributed at the ratio between the S-polarized light component to the P-polarized light component=about 72.2:1, and thus, the S-polarized light component is dominant. On the other hand, in the light quantity of the light flux traveling to the photodetector 17, the polarized components are distributed at the ratio between the S-polarized light component and the P-polarized light component=about 1.27:1. Therefore, the proportion of the P-polarized light component being present is considerably high, as compared with the light quantity of the illumination light. Bearing this relationship in mind, the difference in temperature characteristics (the light-quantity change rate in response to a temperature change) between the polarized components will be described below.

First, in general, the quantity of an emitted laser beam when a constant current is fed decreases by about 10% at 38° C., under the influence of a heat resulting from a temperature rise, as compared with that at 28° C., as illustrated in FIG. 17, for example. Here, as illustrated in FIG. 17, the light quantity of the S-polarized light component of the laser beam emitted from the laser light source decreases by about 10% as mentioned above, when the temperature rises from 28° C. to 38° C. (a rate of change=about 0.91). In contrast, the light quantity of the P-polarized light component of the laser beam emitted from the laser light source decreases by about 20%, when the temperature rises from 28° C. to 38° C. (a rate of change=about 0.81). In other words, a behavior in response to the temperature of the P-polarized light component is different from a behavior in response to the temperature of the S-polarized light component. It is to be noted that each temperatures illustrated in FIG. 17 is the temperature of a laser tube package itself at the time of emitting the laser beam, and each emitted light quantity is an actual value.

Because of the difference between such behaviors in response to the temperatures for the respective polarized components, a difference in temperature characteristic (the light-quantity change rate in response to the temperature change) between the polarized components occurs in a real projector, which will be described as follows. The illumination light, which is present at a light quantity ratio of the S-polarized light component to the P-polarized light component=about 4.75:3.75=about 72.2:1, mainly contains the S-polarized light component as described above. Therefore, about 9% decrease in the light quantity occurs when the temperature change $\Delta T$ is 10° C. $((\Delta ls/\Delta T)=(0.91/10)=0.091)$. On the other hand, as described above, in the light flux traveling to the photodetector 17 existing at a light quantity ratio of the S-polarized light component to the P-polarized light component=about 90.25:1.25=about 1.27:1, about 19% decrease in the light quantity occurs when the temperature change $\Delta T$ is 10° C. $((\Delta lp/\Delta T)=(0.81/10)=0.081)$. Therefore, about 14% decrease in the light quantity occurs, as expressed by the following expression (1), because the P-polarized light component and the S-polarized light component are mixed.

$$(4.75\times0.91+3.75\times0.81)/(4.75+3.75)=0.86 \quad (1)$$

Thus, the decline (about 14%) in the light quantity detected on the photodetector 17 side is greater than the decline (about 9%) in the light quantity occurring on the actual illumination light side. Therefore, overcorrection takes place in the light control by the control section 18, and the light quantity of the illumination light becomes more (brighter) than necessary. In addition, a correction drift rate when the temperature change ΔT is 10° C. is about (0.91/0.86)=1.06 in the temperature rise from 28° C. to 38° C. mentioned above, but the correction drift rate further increases in environments at temperatures higher and lower than that. Specifically, for instance, in a case of use in an environment at a high-temperature of 60° C., an influence thereof is about (60/25)=2.4-fold and therefore, a change of about (6×2.4)=14% to 15% occurs in the quantity of the illumination light. This makes it difficult to achieve stable operation.

(Operation of Present Embodiment)

Therefore, in the present embodiment, the polarizing device 16 is provided in the illumination unit 1B as described above. The polarizing device 16 controls the polarized components so that the same polarized component as the main polarized component (here, the S-polarized light component) in the illumination light relatively increases in the light flux traveling on the light-receiving optical path L2. Specifically, here, as illustrated in FIG. 14, the polarizing device 16 selectively allows, of the light flux traveling on the light-receiving optical path L2, the polarized component (the S-polarized light component) same as the main polarized component in the illumination light to pass therethrough. At the same time, the polarizing device 16 removes the polarized component (the P-polarized light component) different from the main polarized component.

As a result, in the illumination unit 1B, the light quantity distribution in the light flux to be incident upon the photodetector 17 is less likely to vary, even when there occurs, in addition to the change of the light quantity distribution in the laser beam emitted from the laser light source depending on the temperature, the difference in temperature characteristics (the light-quantity change rate in response to the temperature change) between the respective polarized components included in the laser beam. Therefore, in the illumination unit 1B, a further improvement is made in the accuracy of controlling the emitted light quantity for the red laser 11R, the green laser 11G, and the blue laser 11B by the control section 18.

In the present embodiment, as described above, there is provided the polarizing device 16 that controls the polarized components so that the same polarized component as the main polarized component in the illumination light relatively increases, in the light flux traveling on the light-receiving optical path L2. Therefore, the accuracy of controlling the emitted light quantity is further improved, as compared with those in the first and second embodiments. Hence, the light-quantity variations in the illumination light are further reduced.

It is to be noted that in the present embodiment, there has been described the case where the coupling lens 12 in the first embodiment is employed as the "light-quantity-distribution control device", although it is not limited thereto. For example, the diffusion device 12A in the second embodiment may be used. This also applies to fourth and fifth embodiments which will be described below.

[Fourth Embodiment]

Figure 18:
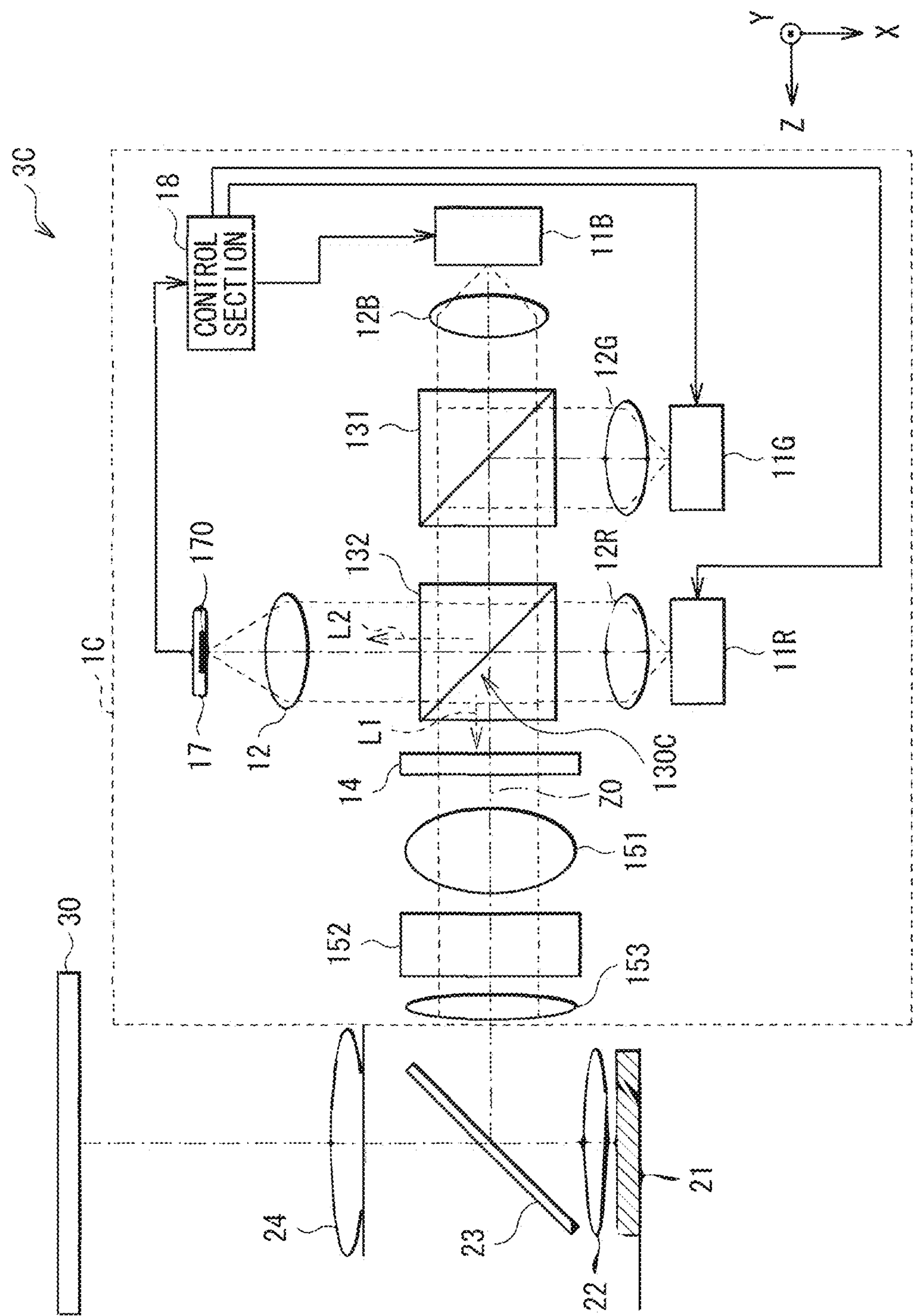
FIG. 18 is a diagram illustrating an overall configuration of a display according to a fourth embodiment.

FIG. 18 illustrates an overall configuration of a display (a display 3C) according to the fourth embodiment. The display 3C of the present embodiment is configured by providing an illumination unit 1C to be described below, in place of the illumination unit 1 in the display 3 of the first embodiment. The display 3C is otherwise similar in configuration to the display 3.

The illumination unit 1C is configured by providing a reflection transmission film 130C to be described below, in place of the reflection transmission film 130 in the dichroic prism 132 of the illumination unit 1 in the first embodiment. The illumination unit 1C is otherwise similar in configuration to the illumination unit 1.

The reflection transmission film 130C controls polarized components so that the same polarized component as a main polarized component (here an S-polarized light component) in illumination light relatively increases in a light flux traveling on a light-receiving optical path L2, in a manner similar to the polarizing device 16 in the third embodiment. In other words, in the present embodiment, a dichroic prism 132 having this reflection transmission film 130C corresponds to a specific but not limitative example of "optical member" in the disclosure. Specifically, unlike the reflection transmission film 130 described above, the reflection transmission film 130C is set so that each of an optical reflectance (a prism reflectance) and an optical transmittance (a prism transmittance) in the dichroic prism 132 becomes substantially constant (desirably, constant), without depending on the polarized components. It is to be noted that such reflection and transmission characteristics are realized by, for example, making adjustments to materials of the reflection transmission film 130C (such as adjustments to a material and a film thickness of each layer, the number of laminated layers, and the like in a multilayer film made of the dielectric materials mentioned above).

Specifically, in an example illustrated in FIG. 19, the reflection and transmission characteristics in the reflection transmission film 130C are set to have about 95% (0.95) of a prism reflectance Rp for an P-polarized light component, which is equal to a prism reflectance Rs for a S-polarized light component, unlike the reflection transmission film 130 described above. Also unlike the reflection transmission film 130, the reflection and transmission characteristics in the reflection transmission film 130C are set to have about 5% (0.05) of a prism transmittance (1−Rs) for the S-polarized light component, which is equal to a prism transmittance (1−Rp) for the P-polarized light component.

Thus, in the present embodiment, the light quantity is distributed at the ratio of the S-polarized light component to the P-polarized light component=19:1, for both the quantity of the illumination light and the quantity of the light flux traveling to the photodetector 17, as illustrated in FIG. 19, for example. As a result, between the quantity of the illumination light and the quantity of the light flux traveling to the photodetector 17, there is no difference in temperature characteristic (a light-quantity change rate in response to a temperature change) based on each polarized component. Therefore, the light quantity distribution in the light flux to be incident upon the photodetector 17 is less likely to vary in the illumination unit 1C of the present embodiment as well, even when there occurs, in addition to a change of the light quantity distribution in a laser beam emitted from a laser light source depending on the temperature, a difference in temperature characteristic (the light-quantity change rate in response to the temperature change) between the respective polarized components included in the laser beam. Therefore, in the illumination unit 1C, a further improvement is made in the accuracy of controlling an emitted light quantity for a red laser 11R, a green laser 11G, and a blue laser 11B by a control section 18.

In the present embodiment, the dichroic prism 132 having the reflection transmission film 130C which controls the polarized components so that the same polarized component as the main polarized component in the illumination light relatively increases, in the light flux traveling on the light-receiving optical path L2, as described above. Therefore, the accuracy of controlling the emitted light quantity is further improved, as compared with those in the first and second embodiments. Hence, variations in the light-quantity in the illumination light are further reduced.

Moreover, in the present embodiment, only making an adjustment to the reflection and transmission characteristics in the reflection transmission film 130C is necessary, and a member like the polarizing device 16 is not necessarily added. Therefore, the cost of members is allowed to be reduced, as compared with the third embodiment.

[Fifth Embodiment]

Figure 20:
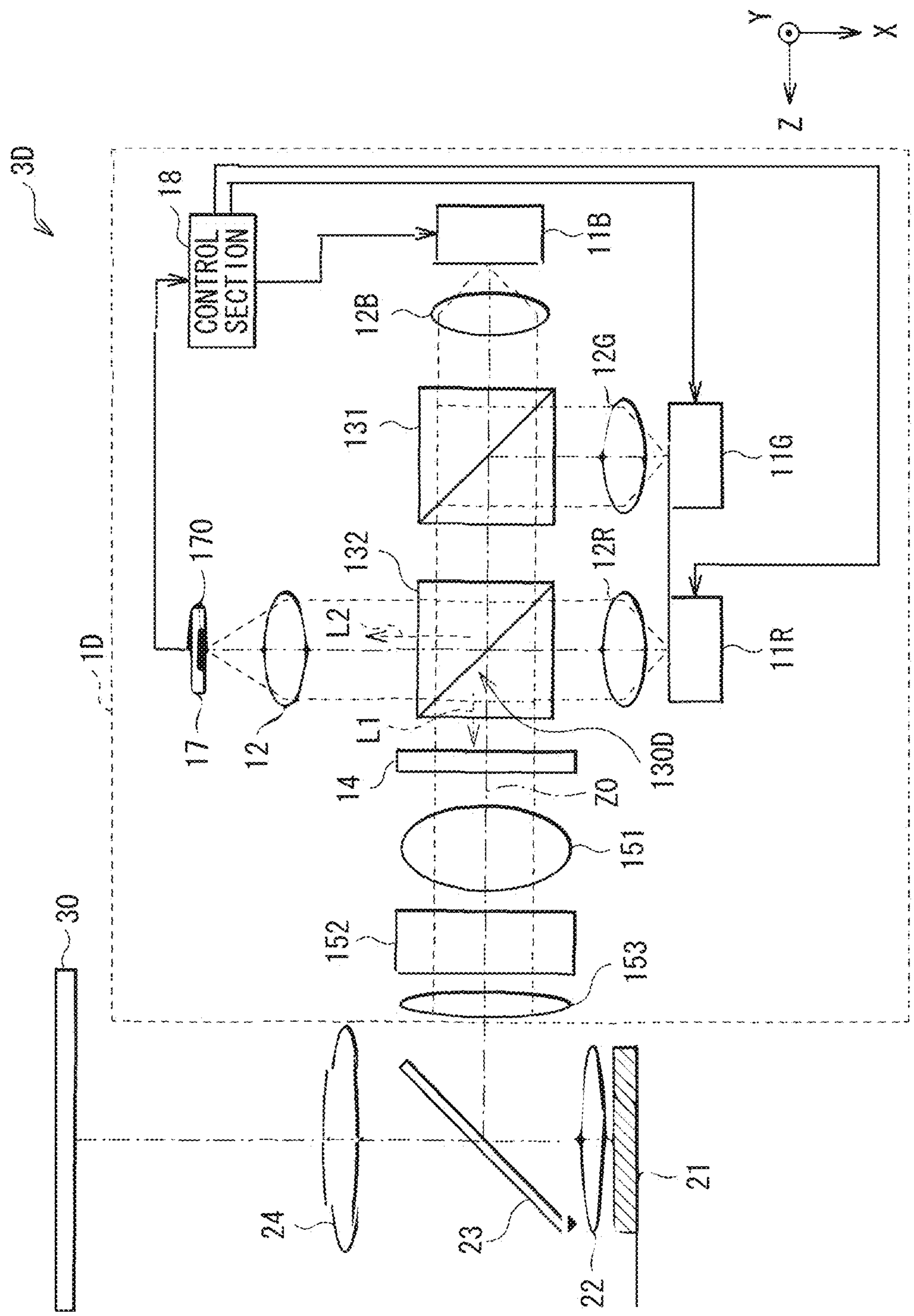
FIG. 20 is a diagram illustrating an overall configuration of a display according to a fifth embodiment.

FIG. 20 illustrates an overall configuration of a display (a display 3D) according to the fifth embodiment. The display 3D of the present embodiment is configured by providing an illumination unit 1D to be described below, in place of the illumination unit 1 in the display 3 of the first embodiment. The display 3D is otherwise similar in configuration to the display 3.

The illumination unit 1D is configured by providing a reflection transmission film 130D to be described below, in place of the reflection transmission film 130 in the dichroic prism 132 of the illumination unit 1 in the first embodiment. The illumination unit 1D is otherwise similar in configuration to the illumination unit 1.

(Reflection Transmission Film 130D)

The reflection transmission film 130D controls polarized components so that the same polarized component as a main polarized component (here, an S-polarized light component) in illumination light relatively increases, in a light flux traveling on a light-receiving optical path L2, in a manner similar to the polarizing device 16 and the reflection transmission film 130C. In other words, in the present embodiment, a dichroic prism 132 having this reflection transmission film 130D corresponds to a specific but not limitative example of "optical member" in the disclosure.

Specifically, in this reflection transmission film 130D, each of an optical reflectance (a prism reflectance) and an optical transmittance (a prism transmittance) is set as follows, unlike the reflection transmission films 130 and 130C described above. Specifically, each of the prism reflectance and the prism transmittance is set for each polarized component, so that a temperature change rate in a reflected light quantity and a temperature change rate in a transmitted light quantity in the dichroic prism 132 are substantially equal to each other (desirably, equal to each other). To be more specific, each of the prism reflectance and the prism transmittance is set so that the amount of a difference between the temperature change rate in the reflected light quantity and the temperature change rate in the transmitted light quantity falls within a predetermined range (e.g., about 10% or less), as will be described below. This makes it possible to address a difference in temperature characteristics (a light-quantity change rate in response to a temperature change) between the respective polarized components included in a laser beam, even when it is difficult to equalize reflection and transmission characteristics in the dichroic prism 132 for each of the polarized components as in the fourth embodiment. It is to be noted that such reflection and transmission characteristics are realized by, for example, making adjustments to materials of the reflection transmission film 130D (such as adjustments to a material and a film thickness of each layer, the number of laminated layers, and the like in a multilayer film made of the dielectric materials mentioned above).

Here, a specific example (Example 3) of the dichroic prism 132 having such a reflection transmission film 130D of the present embodiment will be described in detail. It is to be noted that the following description is provided, assuming that, of a laser beam incident from a laser light source upon the dichroic prism 132, a light flux reflected by the dichroic prism 132 travels on a outgoing optical path L1 (towards a projection lens 24), and a light flux passing through the dichroic prism 132 travels on the light-receiving optical path L2 (towards a photodetector 17). A technique using a similar idea is applicable to the opposite case.

First, FIGS. 21(A), 21(B), 21(C) and 21(D) illustrate an example of a relationship between a polarization component ratio in the emitted laser beam and an optical reflectance for each polarized component in the dichroic prism 132 (the reflection transmission film 130D). The relationship is provided with respect to each of the light flux traveling to the photodetector 17 and the light flux traveling to the projection lens 24. Specifically, FIG. 21(A) illustrates the relationship between the polarization component ratio in the emitted laser beam and the optical reflectance (an S reflectance) for the S-polarized light component in the dichroic prism 132, with respect to the light flux traveling to the photodetector 17. What is illustrated in this FIG. 21(A) corresponds to the light quantity of the S-polarized light component in the light flux traveling to the photodetector 17, which is defined by an expression (2) listed below. In addition, FIG. 21(C) illustrates the relationship between the polarization component ratio in the emitted laser beam and the optical reflectance (a P reflectance) for the P-polarized light component in the dichroic prism 132, with respect to the light flux traveling to the photodetector 17. What is illustrated in this FIG. 21(C) corresponds to the light quantity of the P-polarized light component in the light flux traveling to the photodetector 17, which is defined by an expression (3) listed below. On the other hand, FIG. 21(B) illustrates the relationship between the polarization component ratio in the emitted laser beam and the S reflectance in the dichroic prism 132, with respect to the light flux traveling to the projection lens 24. What is illustrated in this FIG. 21(B) corresponds to the light quantity of the S-polarized light component in the light flux traveling to the projection lens 24, which is defined by an expression (4) listed below. In addition, FIG. 21(D) illustrates the relationship between the polarization component ratio in the emitted laser beam and the P reflectance in the dichroic prism 132, with respect to the light flux traveling to the projection lens 24. What is illustrated in this FIG. 21(D) corresponds to the light quantity of the P-polarized light component in the light flux traveling to the projection lens 24, which is defined by an expression (5) listed below. From these FIGS. 21(A), 21(B), 21(C) and 21(D), it is apparent that each of the light quantity of the light flux traveling to the photodetector 17 and the light quantity of the light flux traveling to the projection lens 24 changes according to the polarization component ratio in the emitted laser beam and the optical reflectance for each of the polarized components in the dichroic prism 132.

$$ls\times(1-Rs) \quad (2)$$

$$lp\times(1-Rp) \quad (3)$$

$$\mathrm{ls}\times\mathrm{Rs} \quad (4)$$

$$\mathrm{lp}\times\mathrm{Rp} \quad (5)$$

FIGS. 22(A) and 22(B) illustrate an example of the relationship between the polarization component ratio in the emitted laser beam and the optical reflectance for each of the polarized components in the dichroic prism 132 (the reflection transmission film 130D) at a normal temperature (about 25° C.). This relationship is provided for each of the light flux traveling to the photodetector 17 and the light flux traveling to the projection lens 24. Specifically, FIG. 22(A) illustrates the relationship between the polarization component ratio in the emitted laser beam and the P reflectance in the dichroic prism 132 at the normal temperature, with respect to the light flux traveling to the photodetector 17. What is illustrated in this FIG. 22(A) corresponds to the light quantity of (P-polarized light component+S-polarized light component) in the light flux traveling to the photodetector 17 at the normal temperature, which is defined by an expression (6) listed below. In addition, FIG. 22(B) illustrates the relationship between the polarization component ratio in the emitted laser beam and the P reflectance in the dichroic prism 132 at the normal temperature, with respect to the light flux traveling to the projection lens 24. What is illustrated in this FIG. 22(B) corresponds to the light quantity of (P-polarized light component+S-polarized light component) in the light flux traveling to the projection lens 24 at the normal temperature, which is defined by an expression (7) listed below. It is to be note that, in the following, the S reflectance in the dichroic prism 132 is assumed to be fixed at about 95%, because the S-polarized light component is dominant in the polarized components in the emitted laser beam as described above.

$$D=\{ls\times(1-Rs)\}+\{lp\times(1-Rp)\} \quad (6)$$

$$B=(ls\times Rs)+(lp\times Rp) \quad (7)$$

FIGS. 22(C) and 22(D) illustrate an example of the relationship between the polarization component ratio in the emitted laser beam and the optical reflectance for each of the polarized components in the dichroic prism 132 (the reflection transmission film 130D), at a high temperature (substantially, 25° C.+ΔT (10° C.)=35° C.). This relationship is provided for each of the light flux traveling to the photodetector 17 and the light flux traveling to the projection lens 24. Specifically, FIG. 22(C) illustrates the relationship between the polarization component ratio in the emitted laser beam and the P reflectance in the dichroic prism 132 at the high temperature, with respect to the light flux traveling to the photodetector 17. What is illustrated in this FIG. 22(C) corresponds to the light quantity of (P-polarized light component+S-polarized light component) in the light flux traveling to the photodetector 17 at the high temperature, which is defined by an expression (8) listed below. In addition, FIG. 22(D) illustrates the relationship between the polarization component ratio in the emitted laser beam and the P reflectance in the dichroic prism 132 at the high temperature, with respect to the light flux traveling to the projection lens 24. What is illustrated in this FIG. 22(D) corresponds to the light quantity of (P-polarized light component+S-polarized light component) in the light flux traveling to the projection lens 24 at the high temperature, which is defined by an expression (9) listed below. It is to be noted that in this calculation is based on (Δls/ΔT)=0.09 and (Δlp/ΔT)=0.08, using experimental values as an example. In addition, depending on a heat radiation design in the laser light source, individual differences occur in the change of an ambient temperature and the temperature change of the laser light source itself. However, in the most cases, the change of an environmental temperature and the temperature change of the laser light source itself serving as a heat-producing section are substantially the same which is ΔT, in a stable condition. Further, the temperature change ΔT in the following expressions is assumed to be the temperature change of the laser light source itself, which occurs in response to the influence of a change in the environmental temperature or a temperature change caused by other heat-producing component.

[Mathematical Expression 1]

$$\begin{cases} C = [\{Is\times(1-Rs)\}\times(\Delta Is/\Delta T)\times\Delta T] + & (8)\\ [\{Ip\times(1-Rp)\}\times(\Delta Ip/\Delta T)\times\Delta T] & \\ A = [(Is\times Rs)\times(\Delta Is/\Delta T)\times\Delta T] + & (9)\\ [(Ip\times Rp)\times(\Delta Ip/\Delta T)\times\Delta T & \end{cases}$$

ΔT: Temperature change in laser (Δls/ΔT): Rate of change in emitted light quantity caused by temperature change of S-polarized light component (Δlp/ΔT): Rate of change in emitted light quantity caused by temperature change of P-polarized light component FIG. 23(A) illustrates a ratio defined by (a value in FIG. 22(C)/a value in FIG. 22(A)). This ratio corresponds to a light-quantity change rate of the light flux traveling to the photodetector 17 at the time of the temperature change (i.e. the temperature change rate in the transmitted light quantity). Further, FIG. 23(B) illustrates a ratio defined by (a value in FIG. 22(D)/a value in FIG. 22(B)). This ratio corresponds to a light-quantity change rate of the light flux traveling to the projection lens 24 at the time of the temperature change (i.e. the temperature change rate in the reflected light quantity).

FIG. 23(C) illustrates a ratio defined by (a value in FIG. 23(B)/a value in FIG. 23(A)) at the time of ΔT=25° C. This ratio corresponds to the amount of difference between the temperature change rate in the reflected light quantity and the temperature change rate in the transmitted light quantity described above. Specifically, in this example, this ratio corresponds to the amount of difference defined by (the temperature change rate in the reflected light quantity/the temperature change rate in the transmitted light quantity). It is to be noted that a gray part region illustrated in FIG. 23(C) is a region where this amount of difference falls within a predetermined range (here, about 10% or less). In other words, when the amount of difference in FIG. 23(C) is 0 (zero), the light quantity of the light flux traveling to the projection lens 24 and the light quantity of the light flux traveling to the photodetector 17 are equal to each other, without depending on the temperature change, and there is no light-quantity variation in the illumination light. On the other hand, when the amount of difference in FIG. 23(C) is other than 0, a light-quantity variation in the illumination light occurs according to the extent of the amount of difference. It is to be noted that, here, an initial adjustment in the laser light source is made at the normal temperature (about 25° C.), and use in a temperature range from about 0° C. to about 50° C. is assumed. Further, the amount of difference is assumed to be maximum at the time of the temperature change ΔT=25° C. Therefore, the values are indicated at the time of the temperature change ΔT=25° C.

For this reason, in the present embodiment, the prism reflectance and the prism transmittance for each of the polarized components in the reflection transmission film 130D are set, so that the temperature change rate in the reflected light quantity and the temperature change rate in the transmitted light quantity in the dichroic prism 132 are substantially equal to each other (desirably, equal to each other), as described above. Specifically, the prism reflectance and the prism transmittance are set so that the amount of difference between the temperature change rate of the reflected light quantity and the temperature change rate of the transmitted light quantity falls within the predetermined range (e.g., about 10% or less). It is to be noted that this 10% which is an example of the upper limit in the amount of difference is a value determined by the following reasons. First of all, in general, the life of a projector is defined as the time before the brightness (luminance) of display light (illumination light) decreases to about 50% of an initial value. However, the performance contributing to the brightness, such as an optical transmittance and an optical reflectance in each component of the projector is assumed to decline by about 10% of an initial value. Therefore, it may be said that it is appropriate to suppress the amount of difference to about 10%, also for a part depending on a temperature change that is a cause of an intensity variation. In addition, it is known from an empirical rule that the human being is able to sensitively detect a discontinuous intensity change. On the other hand, as for an intensity change in which the intensity gradually changes according to the temperature or the like varying over some time, the detectivity of the human being is low, even when the intensity change is about 10%. It is appropriate to set about 10% of the amount of difference as a tolerance (a design margin) for the intensity change, in this respect as well.

Figure 24:
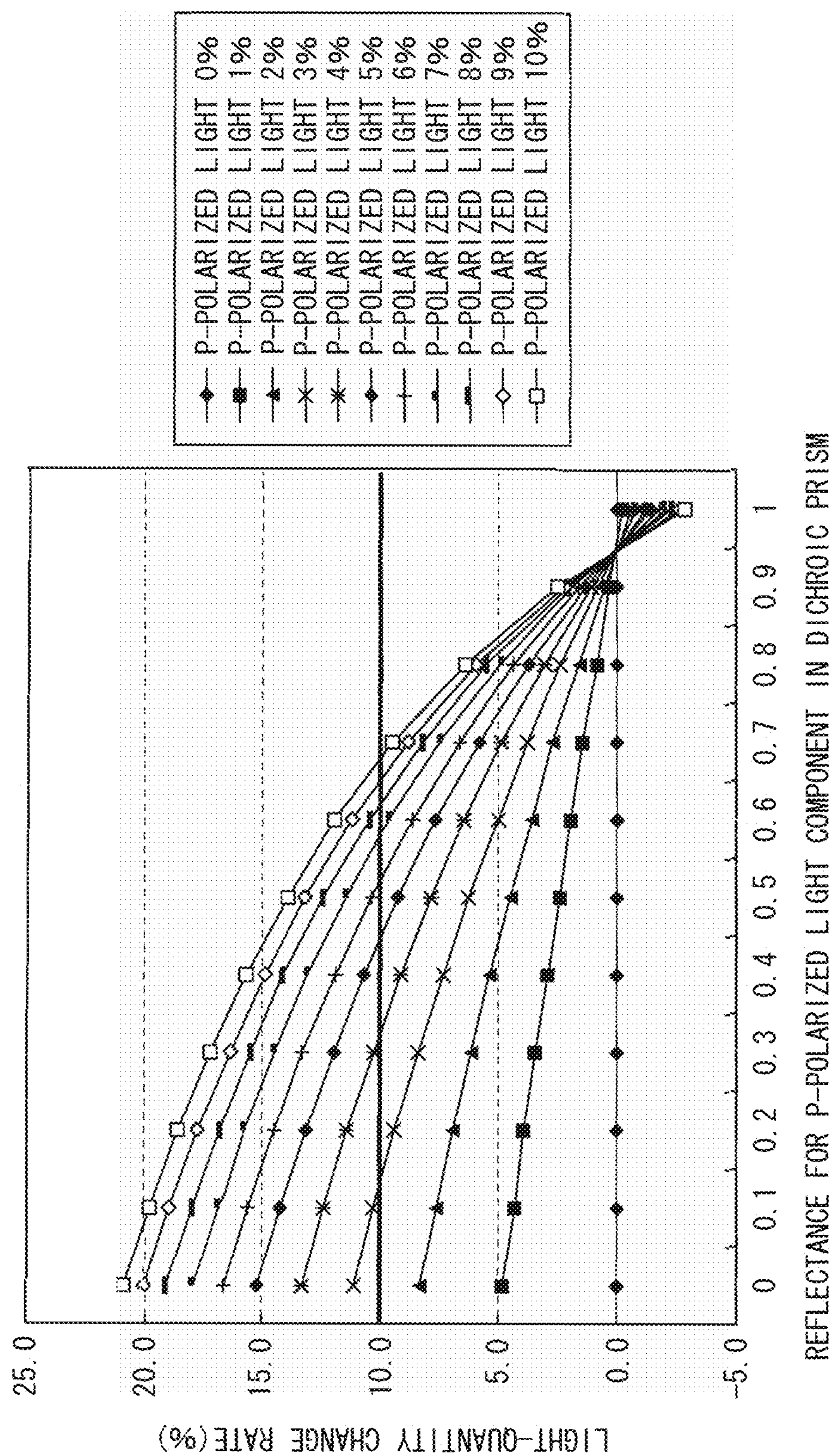
FIG. 24 is a characteristic diagram illustrating a relationship between the temperature change rate of the light quantity and a reflectance for the P-polarized light component in a dichroic prism, according to Example 3.

This is expressed by expressions (10) or (11) listed below, using each of the values A to D defined by the above expressions (6) to (9). Here, the expression (10) corresponds to an expression in a case in which the light flux reflected from the dichroic prism 132 travels to the projection lens 24, and the light flux passing through the dichroic prism 132 travels to the photodetector 17 as described above. On the other hand, the expression (11) corresponds to an expression in a case in which, conversely, the light flux passing through the dichroic prism 132 travels to the projection lens 24, and the light flux reflected from the dichroic prism 132 travels to the photodetector 17. It is to be noted that FIG. 24 illustrates a relationship between the temperature change rate in the light quantity and the reflectance for the P-polarized light component in the dichroic prism according to this Example 3.

[Mathematical Expression 2]

$$\begin{cases} 0.9 \leqq \left[\frac{(A/B)}{(C/D)}\right] \leqq 1.1 & \text{(when the transmitted light is incident upon the photodetector)} \quad (10) \\ 0.9 \leqq \left[\frac{(C/D)}{(A/B)}\right] \leqq 1.1 & \text{(when the reflected light is incident upon the photodetector)} \quad (11) \end{cases}$$

In the present embodiment, the dichroic prism 132 having the reflection transmission film 130D is provided. The reflection transmission film 130D controls the polarized components so that the same polarized component as the main polarized component in the illumination light relatively increases in the light flux traveling on the light-receiving optical path L2. Therefore, even when there occurs, in addition to the change of the light quantity distribution in the laser beam emitted from the laser light source depending on the temperature, the difference in temperature characteristics (the light-quantity change rate in response to the temperature change) between the polarized components included in the laser beam, the light quantity distribution in the light flux to be incident upon the photodetector 17 is less likely to vary. Therefore, as compared with the first and second embodiments, the accuracy of controlling the emitted light quantity is further improved, and the light-quantity variations in the illumination light are further reduced.

In addition, only making an adjustment to the reflection and transmission characteristics in the reflection transmission film 130D is necessary, and a member like the polarizing device 16 is not necessarily added, in the present embodiment as well. Thus, the cost of members is reduced, as compared with the third embodiment.

[Modifications]

The technology of the disclosure has been described with reference to the embodiments, but is not limited to these embodiments, and may be variously modified.

For example, in the embodiments, the coupling lens 12 and the diffusion device 12A are each taken as an example of the light-quantity-distribution control device, although it is not limited to these examples. Alternatively, other device may be used as the light-quantity-distribution control device. Likewise, in the embodiments, the polarizing device 16 and the dichroic prism 132 having the reflection transmission film 130C or 130D are each taken as an example of the optical member, although it is not limited to these examples. Alternatively, other member may be used as the optical member.

Further, in the embodiments, the case where the main polarized component in the illumination light is the S-polarized light component has been described. However, the technology is not limited to this case, and is applicable to a case where the main polarized component in the illumination light is the P-polarized light component, conversely.

Furthermore, in the embodiments, the case where each of the plural kinds of light source (for red, green, and blue) serves as the laser light source has been described, although the technology is not limited to this case. The technology is applicable to any case, as long as one or more of the plural kinds of light source are provided as the laser light source. For instance, the laser light source and other type of light source (e.g., LED) may be combined and provided in the light source section.

In addition, in the embodiments, the case where the light modulation device is the reflection-type liquid crystal device has been described as an example, although the technology is not limited to this case. The light modulation device may be a transmissive liquid crystal device, or may be a light modulation device other than the liquid crystal device (e.g., DMD (Digital Micromirror Device)).

Still furthermore, in the embodiments, the case where the three kinds of light sources emitting light of different wavelengths has been described. However, one kind, or two kinds, or four or more of kinds of light sources may be used, for example.

Moreover, in the embodiments, each component (optical system) of the illumination unit and the display has been described as a specific example. However, it is not necessary to provide all the components, or other components may be further provided. Specifically, for example, a dichroic mirror may be provided in place of the dichroic prisms 131 and 132.

In addition, in the embodiments, there has been described the case where the projection-type display having the projection optical system (the projection lens) that projects the light modulated by the light modulation device onto the screen is configured. However, the technology is applicable to a direct-viewing-type display.

It is to be noted that the technology may be configured as follows.

(1) An illumination unit including:

a light source section including a laser light source;

an optical-path branching device outputting light incident from the light source section, by branching the light into an outgoing optical path of illumination light and other optical path;

a photodetector receiving a light flux that travels on the other optical path;

a control section controlling an emitted light quantity in the laser light source, based on a quantity of the light flux received by the photodetector; and a light-quantity-distribution control device disposed between the optical-path branching device and the photodetector on the other optical path, the light-quantity-distribution control device controlling a light quantity distribution in the light flux to be incident upon the photodetector.

(2) The illumination unit according to (1), wherein an optical member is provided, the optical member controlling polarized components to increase a polarized component same as a main polarized component in the illumination light relatively, in the light flux traveling on the other optical path.

(3) The illumination unit according to (2), wherein the optical member is a polarizing device disposed between the optical-path branching device and the photodetector on the other optical path, and the polarizing device selectively allows, of the light flux traveling on the other optical path, the polarized component same as the main polarized component in the illumination light to pass therethrough.

(4) The illumination unit according to (2), wherein the optical member is a dichroic prism serving as the optical-path branching device, and optical characteristics in the dichroic prism are set to allow each of an optical reflectance and an optical transmittance in the dichroic prism to be substantially constant without depending on a polarized component.

(5) The illumination unit according to (4), wherein the dichroic prism includes a reflection transmission film that defines each of the optical reflectance and the optical transmittance, and the optical characteristics are set by the reflection transmission film.

(6) The illumination unit according to (2), wherein the optical member is a dichroic prism serving as the optical-path branching device, and an optical reflectance and an optical transmittance for each polarized component in the dichroic prism are each set to allow a temperature change rate of a reflected light quantity and a temperature change rate of a transmitted light quantity in the dichroic prism to be substantially equal to each other.

(7) The illumination unit according to (6), wherein the optical reflectance and the optical transmittance for each polarized component are each set to allow an amount of a difference between the temperature change rate of the reflected light quantity and the temperature change rate of the transmitted light quantity to be substantially 10% or less.

(8) The illumination unit according to (6) or (7), wherein the dichroic prism includes a reflection transmission film that defines each of the optical reflectance and the optical transmittance, and a ratio between the temperature change rate of the reflected light quantity and the temperature change rate of the transmitted light quantity is set by the reflection transmission film.

(9) The illumination unit according to any one of (1) to (8), wherein the light-quantity-distribution control device is a refractive device with positive power.

(10) The illumination unit according to any one of (1) to (8), wherein the light-quantity-distribution control device is a diffusion device that diffuses the light flux traveling on the other optical path, the diffusion device outputting the diffused light flux.

(11) The illumination unit according to any one of (1) to (10), wherein the control section controls the emitted light quantity in the laser light source to allow the emitted light quantity to be substantially constant without depending on a temperature change.

(12) The illumination unit according to any one of (1) to (11), wherein the light source section includes, as the laser light source, three kinds of laser light sources which emit red light, green light, and blue light.

(13) The illumination unit according to any one of (1) to (12), wherein the laser light source is a semiconductor laser.

(14) A display including an illumination unit that emits illumination light, and a light modulation device that modulates the illumination light based on an image signal, the illumination unit including:

a light source section including a laser light source;

an optical-path branching device outputting light incident from the light source section, by branching the light into an outgoing optical path of illumination light and other optical path;

a photodetector receiving a light flux traveling on the other optical path;

a control section controlling an emitted light quantity in the laser light source, based on a quantity of the light flux received by the photodetector; and a light-quantity-distribution control device disposed between the optical-path branching device and the photodetector on the other optical path, the light-quantity-distribution control device controlling a light quantity distribution in the light flux to be incident upon the photodetector.

(15) The display according to (14), further including a projection optical system that projects the illumination light modulated by the light modulation device onto a projection surface.

(16) The display according to (14) or (15), wherein the light modulation device is a liquid crystal device.

The disclosure contains subject matter related to that disclosed in Japanese Priority Patent Application JP 2011-153485 filed in the Japan Patent Office on Jul. 12, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illumination unit, comprising:

a plurality of laser light sources;

a dichroic prism configured to output light incident from the plurality of laser light sources, wherein the output light comprises a first optical path and a second optical path;

a photodetector configured to receive a light flux that travels on the second optical path;

an automatic power controller configured to control a quantity of the light emitted from the plurality of laser light sources based on a quantity of the light flux received by the photodetector; and a coupling lens configured to control a distribution of the quantity of the light flux received by the photodetector.

2. The illumination unit according to claim 1, further comprising:

a reflection transmission film configured to control polarized components to increase polarization of a first polarized component in the light flux which travels on the second optical path, wherein the first polarized component in the light flux is same as a main polarized component in the emitted light.

3. The illumination unit according to claim 2, wherein:

the reflection transmission film is disposed between the dichroic prism and the photodetector on the second optical path, and the reflection transmission film selectively allows the first polarized component in the light flux to pass therethrough.

4. The illumination unit according to claim 2, wherein optical characteristics of the dichroic prism are set to allow each of an optical reflectance and an optical transmittance in the dichroic prism to be constant without dependence on the polarized components.

5. The illumination unit according to claim 4, wherein:

the dichroic prism includes the reflection transmission film which defines each of the optical reflectance and the optical transmittance, and the optical characteristics are set by the reflection transmission film.

6. The illumination unit according to claim 2, wherein an optical reflectance and an optical transmittance for each of the polarized components are set to allow a temperature change rate of a reflected light quantity from the reflection transmission film to be equal to a temperature change rate of a transmitted light quantity from the reflection transmission film.

7. The illumination unit according to claim 6, wherein the optical reflectance and the optical transmittance for each of the polarized components are set to allow an amount of difference between the temperature change rate of the reflected light quantity and the temperature change rate of the transmitted light quantity to be at most 10%.

8. The illumination unit according to claim 6, wherein:

the dichroic prism includes the reflection transmission film which defines each of the optical reflectance and the optical transmittance, and a ratio between the temperature change rate of the reflected light quantity and the temperature change rate of the transmitted light quantity is set by the reflection transmission film.

9. The illumination unit according to claim 1, wherein the coupling lens is a refractive lens with positive power.

10. The illumination unit according to claim 1, wherein the coupling lens is further configured to:

diffuse the light flux traveling on the second optical path; and output the diffused light flux.

11. The illumination unit according to claim 1, wherein the automatic power controller is further configured to control the emitted light quantity from the plurality of laser light sources to allow the emitted light quantity to be constant without dependence on a temperature change.

12. The illumination unit according to claim 1, wherein the plurality of laser light sources include three kinds of laser light sources which emit red light, green light, and blue light.

13. The illumination unit according to claim 12, wherein the plurality of laser light sources are semiconductor lasers.

14. The illumination unit according to claim 1, wherein the coupling lens is disposed between the dichroic prism and the photodetector on the second optical path.

15. The illumination unit according to claim 1, wherein the plurality of laser light sources include LED source.

16. A display, comprising:

an illumination unit that is configured to emit illumination light; and a light modulation unit that is configured to modulate the illumination light based on an image signal, wherein:

the illumination unit includes:

a plurality of laser light sources, a dichroic prism configured to output light incident from the plurality of laser light sources, wherein the output light comprises a first optical path and a second optical path, a photodetector configured to receive a light flux traveling on the second optical path, an automatic power controller configured to control a quantity of the light emitted from the plurality of laser light sources, based on a quantity of the light flux received by the photodetector, and a coupling lens configured to control a distribution of the quantity of the light flux received by the photodetector.

17. The display according to claim 16, further comprising:

a projection optical unit that is configured to project the illumination light, modulated by the light modulation unit, onto a projection surface.

18. The display according to claim 16, wherein the light modulation unit is a liquid crystal device.

* * * * *